(12) United States Patent
Galchev et al.

(10) Patent No.: US 8,707,323 B2
(45) Date of Patent: Apr. 22, 2014

(54) LOAD BALANCING ALGORITHM FOR SERVICING CLIENT REQUESTS

(75) Inventors: Galin Galchev, Sofia (BG); Christian Fleischer, Mannheim (DE); Oliver Luik, Wiesloch (DE)

(73) Assignee: SAP AG, Walldorf (DE)

( * ) Notice: Subject to any disclaimer, the term of this patent is extended or adjusted under 35 U.S.C. 154(b) by 1510 days.

(21) Appl. No.: 11/322,399

(22) Filed: Dec. 30, 2005

(65) Prior Publication Data

US 2007/0156869 A1  Jul. 5, 2007

(51) Int. Cl.
*G06F 9/46* (2006.01)

(52) U.S. Cl.
USPC .......................................................... 718/105

(58) Field of Classification Search
USPC .......................................................... 718/105
See application file for complete search history.

(56) References Cited

U.S. PATENT DOCUMENTS

| | | |
|---|---|---|
| 5,497,463 A | 3/1996 | Stein et al. |
| 5,553,242 A | 9/1996 | Russell et al. |
| 5,590,328 A | 12/1996 | Seno et al. |
| 5,617,570 A | 4/1997 | Russell et al. |
| 5,692,193 A | 11/1997 | Jagannathan et al. |
| 5,745,703 A | 4/1998 | Cetjin et al. |
| 5,870,742 A | 2/1999 | Chang et al. |
| 5,907,675 A | 5/1999 | Aahlad |
| 5,951,643 A | 9/1999 | Shelton et al. |
| 5,961,584 A | 10/1999 | Wolf |
| 5,974,443 A | 10/1999 | Jeske et al. |
| 5,974,566 A | 10/1999 | Ault et al. |
| 6,098,093 A | 8/2000 | Bayeh et al. |
| 6,167,423 A | 12/2000 | Chopra et al. |
| 6,167,449 A | 12/2000 | Arnold et al. |
| 6,199,179 B1 | 3/2001 | Kauffman et al. |
| 6,216,152 B1 | 4/2001 | Wong et al. |
| 6,223,202 B1 | 4/2001 | Bayeh |
| 6,292,099 B1 | 9/2001 | Tse et al. |
| 6,324,580 B1 * | 11/2001 | Jindal et al. ................... 709/228 |
| 6,339,782 B1 | 1/2002 | Gerard et al. |
| 6,356,529 B1 | 3/2002 | Zarom |
| 6,385,643 B1 | 5/2002 | Jacobs et al. |
| 6,385,653 B1 | 5/2002 | Sitaraman et al. |
| 6,401,109 B1 | 6/2002 | Heiney et al. |
| 6,502,148 B1 | 12/2002 | Krum |
| 6,539,445 B1 | 3/2003 | Krum |
| 6,601,112 B1 | 7/2003 | O'Rourke et al. |
| 6,654,765 B2 | 11/2003 | Wong et al. |

(Continued)

FOREIGN PATENT DOCUMENTS

| | | |
|---|---|---|
| EP | 1387262 | 2/2004 |
| EP | 1027796 | 6/2004 |

(Continued)

OTHER PUBLICATIONS

PCT International Search Report for PCT/EP2006/012420 mailed May 7, 2007. International filing date Dec. 21, 2006.

(Continued)

*Primary Examiner* — Gregory A Kessler

(74) *Attorney, Agent, or Firm* — Blakely, Sokoloff, Taylor & Zafman

(57) ABSTRACT

A connection manager includes a dispatcher that dispatches requests to worker nodes in an application server according to a load balancing algorithm.

21 Claims, 13 Drawing Sheets

(56) References Cited

U.S. PATENT DOCUMENTS

| | | |
|---|---|---|
| 6,665,674 B1 | 12/2003 | Buchanan et al. |
| 6,681,251 B1 | 1/2004 | Leymann et al. |
| 6,687,702 B2 | 2/2004 | Vaitheeswaran et al. |
| 6,728,748 B1 | 4/2004 | Mangipudi et al. |
| 6,735,769 B1 * | 5/2004 | Brenner et al. ............... 718/105 |
| 6,766,515 B1 | 7/2004 | Bitar et al. |
| 6,799,202 B1 | 9/2004 | Hankinson et al. |
| 6,842,770 B1 | 1/2005 | Serlet et al. |
| 6,854,115 B1 | 2/2005 | Bernard et al. |
| 6,895,584 B1 | 5/2005 | Belkin |
| 6,934,755 B1 | 8/2005 | Saulpaugh |
| 6,938,085 B1 | 8/2005 | Belkin et al. |
| 6,941,307 B2 | 9/2005 | Papanikolaou et al. |
| 7,039,671 B2 | 5/2006 | Cullen |
| 7,107,413 B2 | 9/2006 | Rosenbluth et al. |
| 7,111,300 B1 | 9/2006 | Salas et al. |
| 7,127,713 B2 | 10/2006 | Davis et al. |
| 7,039,792 B1 | 11/2006 | Mischra et al. |
| 7,155,515 B1 * | 12/2006 | Brown et al. ............... 709/226 |
| 7,165,241 B2 | 1/2007 | Manda et al. |
| 7,177,823 B2 | 2/2007 | Lam et al. |
| 7,184,922 B2 | 2/2007 | Ousley et al. |
| 7,191,170 B2 | 3/2007 | Ganguly et al. |
| 7,231,435 B2 | 6/2007 | Ohta |
| 7,251,815 B2 | 7/2007 | Donovan et al. |
| 7,266,616 B1 | 9/2007 | Munshi et al. |
| 7,277,935 B2 | 10/2007 | Sato |
| 7,290,015 B1 | 10/2007 | Singhal et al. |
| 7,302,686 B2 | 11/2007 | Togawa |
| 7,305,495 B2 | 12/2007 | Carter |
| 7,328,238 B2 | 2/2008 | Forslund |
| 7,333,974 B2 | 2/2008 | Patterson |
| 7,334,038 B1 | 2/2008 | Crow et al. |
| 7,343,513 B1 | 3/2008 | Basu et al. |
| 7,349,921 B2 | 3/2008 | Hirstius et al. |
| 7,373,661 B2 | 5/2008 | Smith et al. |
| 7,395,338 B2 | 7/2008 | Fujinaga |
| 7,406,692 B2 | 7/2008 | Halpern et al. |
| 7,409,709 B2 | 8/2008 | Smith et al. |
| 7,412,532 B2 | 8/2008 | Gondhalekar et al. |
| 7,418,560 B1 | 8/2008 | Wintergerst |
| 7,421,495 B2 | 9/2008 | Yang et al. |
| 7,421,702 B1 | 9/2008 | Margulis et al. |
| 7,444,536 B1 | 10/2008 | Jairath |
| 7,467,162 B2 | 12/2008 | Rosenbloom et al. |
| 7,532,571 B1 | 5/2009 | Price et al. |
| 7,536,690 B2 | 5/2009 | Alverson et al. |
| 7,543,289 B2 | 6/2009 | Cai et al. |
| 7,584,474 B2 | 9/2009 | Gondi et al. |
| 7,590,727 B1 | 9/2009 | Barnes |
| 7,593,930 B2 | 9/2009 | Braun et al. |
| 7,644,118 B2 | 1/2010 | Phillips |
| 7,735,097 B2 | 6/2010 | Kovachka-Dimitrova et al. |
| 7,761,435 B2 | 7/2010 | Stanev et al. |
| 2001/0054004 A1 | 12/2001 | Powers |
| 2002/0049767 A1 | 4/2002 | Bennett |
| 2002/0083118 A1 | 6/2002 | Sim |
| 2002/0087700 A1 | 7/2002 | Chae |
| 2002/0133805 A1 | 9/2002 | Pugh et al. |
| 2002/0161957 A1 | 10/2002 | Comeau et al. |
| 2002/0165909 A1 | 11/2002 | Martin et al. |
| 2002/0174097 A1 | 11/2002 | Rusch et al. |
| 2002/0198923 A1 | 12/2002 | Hayes |
| 2003/0014525 A1 | 1/2003 | DeLima et al. |
| 2003/0018707 A1 | 1/2003 | Flocken |
| 2003/0037148 A1 | 2/2003 | Pedersen |
| 2003/0037178 A1 | 2/2003 | Vessey et al. |
| 2003/0046441 A1 | 3/2003 | Rau et al. |
| 2003/0056199 A1 | 3/2003 | Li et al. |
| 2003/0058880 A1 | 3/2003 | Sarkinen et al. |
| 2003/0065711 A1 | 4/2003 | Acharya et al. |
| 2003/0088604 A1 | 5/2003 | Kuck et al. |
| 2003/0097360 A1 | 5/2003 | McGuire et al. |
| 2003/0120811 A1 | 6/2003 | Hanson et al. |
| 2003/0135568 A1 | 7/2003 | Kim et al. |
| 2003/0167333 A1 | 9/2003 | Kumar et al. |
| 2003/0182261 A1 | 9/2003 | Patterson |
| 2003/0187927 A1 | 10/2003 | Winchell |
| 2003/0200526 A1 | 10/2003 | Arcand |
| 2003/0204645 A1 | 10/2003 | Sharma et al. |
| 2003/0208563 A1 | 11/2003 | Acree et al. |
| 2004/0024971 A1 | 2/2004 | Bogin et al. |
| 2004/0054725 A1 | 3/2004 | Moller et al. |
| 2004/0068554 A1 | 4/2004 | Bales et al. |
| 2004/0098726 A1 | 5/2004 | Currie et al. |
| 2004/0107240 A1 | 6/2004 | Zabarski et al. |
| 2004/0133691 A1 | 7/2004 | Shimada |
| 2004/0167980 A1 | 8/2004 | Doyle et al. |
| 2004/0172618 A1 | 9/2004 | Marvin |
| 2004/0186906 A1 | 9/2004 | Torrant et al. |
| 2004/0210500 A1 | 10/2004 | Sobel et al. |
| 2004/0213172 A1 | 10/2004 | Myers et al. |
| 2004/0221285 A1 | 11/2004 | Donovan et al. |
| 2004/0221294 A1 | 11/2004 | Kalmuk et al. |
| 2004/0243709 A1 | 12/2004 | Kalyanavarathan et al. |
| 2004/0250248 A1 | 12/2004 | Halpern et al. |
| 2005/0021594 A1 | 1/2005 | Bernardin et al. |
| 2005/0044197 A1 | 2/2005 | Lai |
| 2005/0044551 A1 | 2/2005 | Sodhi |
| 2005/0071459 A1 | 3/2005 | Costa-Requena et al. |
| 2005/0086237 A1 | 4/2005 | Monnie et al. |
| 2005/0086662 A1 | 4/2005 | Monnie et al. |
| 2005/0091388 A1 | 4/2005 | Kamboh et al. |
| 2005/0125503 A1 | 6/2005 | Iyengar et al. |
| 2005/0138193 A1 | 6/2005 | Encarnacion et al. |
| 2005/0155011 A1 | 7/2005 | Heik et al. |
| 2005/0180429 A1 | 8/2005 | Ghahremani et al. |
| 2005/0188055 A1 | 8/2005 | Saletore |
| 2005/0188068 A1 | 8/2005 | Kilian |
| 2005/0198199 A1 | 9/2005 | Dowling |
| 2005/0216421 A1 | 9/2005 | Barry et al. |
| 2005/0238047 A1 | 10/2005 | Holland et al. |
| 2005/0246717 A1 | 11/2005 | Poole et al. |
| 2005/0256880 A1 | 11/2005 | Nam Koong et al. |
| 2005/0262493 A1 | 11/2005 | Schmidt et al. |
| 2005/0262512 A1 | 11/2005 | Schmidt et al. |
| 2005/0278270 A1 | 12/2005 | Carr et al. |
| 2005/0289536 A1 | 12/2005 | Nayak et al. |
| 2006/0026286 A1 | 2/2006 | Lei et al. |
| 2006/0029054 A1 | 2/2006 | Breh et al. |
| 2006/0048160 A1 * | 3/2006 | Olszewski et al. ............ 718/105 |
| 2006/0053087 A1 | 3/2006 | Pavlov |
| 2006/0053425 A1 | 3/2006 | Berkman et al. |
| 2006/0069712 A1 | 3/2006 | Anders et al. |
| 2006/0074990 A1 | 4/2006 | Burka et al. |
| 2006/0117316 A1 | 6/2006 | Cismas et al. |
| 2006/0129512 A1 | 6/2006 | Braun et al. |
| 2006/0129546 A1 | 6/2006 | Braun et al. |
| 2006/0129981 A1 | 6/2006 | Dostert et al. |
| 2006/0130063 A1 | 6/2006 | Kilian et al. |
| 2006/0143217 A1 | 6/2006 | Stanev et al. |
| 2006/0143284 A1 | 6/2006 | Galchev |
| 2006/0143328 A1 | 6/2006 | Fleischer et al. |
| 2006/0143387 A1 | 6/2006 | Petev et al. |
| 2006/0143389 A1 | 6/2006 | Kilian et al. |
| 2006/0143608 A1 | 6/2006 | Dostert et al. |
| 2006/0143609 A1 | 6/2006 | Stanev |
| 2006/0143618 A1 | 6/2006 | Fleischer et al. |
| 2006/0143619 A1 | 6/2006 | Galchev et al. |
| 2006/0155756 A1 | 7/2006 | Stanev |
| 2006/0155867 A1 | 7/2006 | Kilian et al. |
| 2006/0193318 A1 | 8/2006 | Narasimhan |
| 2006/0236306 A1 | 10/2006 | DeBruin et al. |
| 2006/0248036 A1 | 11/2006 | Stanev et al. |
| 2006/0248119 A1 | 11/2006 | Stanev et al. |
| 2006/0248140 A1 | 11/2006 | Birenheide |
| 2006/0248177 A1 | 11/2006 | Dostert et al. |
| 2006/0248198 A1 | 11/2006 | Galchev |
| 2006/0248199 A1 | 11/2006 | Stanev |
| 2006/0248200 A1 | 11/2006 | Stanev |
| 2006/0248234 A1 | 11/2006 | Pope et al. |
| 2006/0248283 A1 | 11/2006 | Galchev et al. |
| 2006/0248350 A1 | 11/2006 | Stanev |
| 2006/0253558 A1 | 11/2006 | Acree et al. |

(56) References Cited

U.S. PATENT DOCUMENTS

| | | | |
|---|---|---|---|
| 2006/0274064 | A1 | 12/2006 | Dougherty et al. |
| 2006/0282509 | A1 | 12/2006 | Kilian et al. |
| 2006/0294253 | A1 | 12/2006 | Linderman |
| 2007/0027877 | A1 | 2/2007 | Droshev et al. |
| 2007/0027896 | A1 | 2/2007 | Newport et al. |
| 2007/0050768 | A1 | 3/2007 | Brown et al. |
| 2007/0055781 | A1 | 3/2007 | Fleischer et al. |
| 2007/0130303 | A1 | 6/2007 | Anna et al. |
| 2007/0150586 | A1 | 6/2007 | Kilian et al. |
| 2007/0156869 | A1 | 7/2007 | Galchev et al. |
| 2007/0156907 | A1 | 7/2007 | Galchev et al. |
| 2007/0245167 | A1 | 10/2007 | De La Cruz et al. |
| 2009/0217369 | A1 | 8/2009 | Abeni et al. |

FOREIGN PATENT DOCUMENTS

| | | |
|---|---|---|
| WO | WO-0023898 | 4/2000 |
| WO | WO 01/42908 | 6/2001 |
| WO | WO-03073204 | 9/2003 |
| WO | WO-2004038586 | 5/2004 |

OTHER PUBLICATIONS

Kaushik, Dutta et al., "ReDAL: An Efficient and Practical Request Distribution Technique for the Application Layer",*Internet Article* Nov. 11, 2005, Singapore Management University, 1-30.

Vandermeer et al., "ReDAL: Request Distribution for the Application Layer", *Distributed Computing Systems*, Jun. 6, 2005, pp. 717-726.

Non-Final Office Action for U.S. Appl. No. 11/118,019 Mailed Nov. 13, 2008, 10 pages.

Non-Final Office Action for U.S. Appl. No. 11/322,596, Mailed Jan. 23, 2009, 12 pages.

Non-Final Office Action for U.S. Appl. No. 11/024,924, Mailed Apr. 10, 2008, 16 pages.

Final Office Action for U.S. Appl. No. 11/024,924, Mailed Oct. 8, 2008, 9 pages.

Non-Final Office Action for U.S. Appl. No. 11/025,525, Mailed Feb. 19, 2009, 15 pages.

Final Office Action for U.S. Appl. No. 11/221,243, Mailed Feb. 27, 2009, 15 pages.

Non-Final Office Action for U.S. Appl. No. 11/221,243, Mailed Sep. 2, 2008, 18 pages.

Final Office Action for U.S. Appl. No. 11/185,199 Mailed Mar. 19, 2009, 18 pages.

Non-Final Office Action for U.S. Appl. No. 11/024,924, Mailed Apr. 24, 2009, 15 pages.

Notice of Allowance for U.S. Appl. No. 11/025,378, Mailed Jul. 2, 2009, 12 pages.

Final Office Action for U.S. Appl. No. 11/025,525, Mailed Sep. 14, 2009, 13 Pages.

Non-Final Office Action for U.S. Appl. No. 11/321,326, Mailed Oct. 26, 2009, 12 Pages.

European Office Action for EP Patent Application No. 06841109.9 mailed Jul. 10, 2009.

Notice of Allowance for U.S. Appl. No. 11/149,562 Mailed Nov. 16, 2009, 28 Pages.

"SAP Web Application Server Security Guide", *Version 1.00*, (Apr. 29, 2004), pp. 79-81, 89.

OA Mailed Mar. 31, 2008, for U.S. Appl. No. 11/025,378, Whole Document.

OA Mailed Sep. 18, 2007 for US Paten Application, Whole Document.

"Failover for Clustered RMI-P4 Remote Objects", SAP Library, http://help.sap.com/saphelp_nw04/helpdata/en/f6/4ef11ab3a52f408aa8a133f33d6cf1/cont Nov. 2004, pp. 1-3.

"Failover for Enterprise Beans", SAP Library, http://help.sap.com/saphelp_nw04/helpdata/en/8f/d6e45953a494499ea1b79ab16321d2/cont Nov. 2004, pp. 1-3.

"Failover System", SAP Library, Nov. 2004, http://help.sap.com/saphelp_nw04/helpdata/en/d7/57af0cce55143be5de3a6e4911186.cont, 2 pages.

"High Availability and Failover", SAP Library, http://help.sap.com/saphelp_w04/helpdata/en/6c/209da105668c45be12f1d9cc412e2b/cont. Nov. 2004, pp. 1-2.

"Http Sessions and Failover of Web Application", SAP Library, Nov. 2004, 1 page. http://help.sap.com/saphelp_nw04/helpdata.en.90/044cc585eaba42b649f16181b0fdf/cont.

"Java Technology in SAP Web Application Server", *SAP Library*, http://help.sap.com/saphelp_nw04/helpdata/en/0d/a3bbeff62847ae10000000a114084/cont Nov. 2004, pp. 1-3.

"Load Balancing of the SAP Web As for Java Applications", SAP Library, http://help.sap.com/saphelp_nw04/helpdata/en/b5/e8239ef7bd494f896a84625d4b688f/cont. 2 pages, Nov. 2004.

"Marshalling Your Data", pp. 1, http://java.sun.com/xml/jaxp/dist/1.0.1/docs/binding/Bindings2Marshall.html.

"RMI Clients on SAP NetWeaver", SAP Platform Ecosystem, (2005), Whole Document.

"SAP Beefs Up Java Support Capabilities For NetWeaver", *News Story*, Oct. 11 2004, (*Computerworld*) http...www.computerworld.com/printthis/2004/0,4814.96558.00.html, pp. 1-2.

"SAP NetWever Makes Standard Java Robust", http://www.sap.com/company/press/press/epx?pageview=print&pressid=3069, Oct. 5, 2004, pp. 1-2.

"SAP Presents New Capabilities for NetWeaver", InfoWorld, Oct. 6, 2004 pp. 1-5, http://www.infoworld.com/article/04/10/06/HNsapnetweaver_1. html.

"System and Method for Shared Memory/File System Java ObjectGroup Clustered JVM", http://priorartdatabase.com/IPCCON000021597/, Published Jan. 2004, 3 pages.

JVM, http://priorartdatabase.com/IPCON000021597/. Published Jan. 2004, 3 pages.

"WebLogic RMI Features and Guidelines", eDocs, pp. 1-7, Nov. 2004, http://e-docs.bea.com/wls/docs90/rmi/rmi_api.html.

Barker, et al., ""A load balancing framework for adaptive and asynchronous applications"", Parallel and Distributed Systems, IEEE Transactions on vol. 15, Issue 2, (Feb. 2004), pp. 183-192.

Barrett, Ryan , "P4 Protocol Specification", (Sep. 2001), 1-12.

Bortvedt, Jerry , "Functional Specification for Object Caching Service for Java (OCS4J) 2.0", retrieved from http://jcp.org/en/jsr/detail?id=107, (Mar. 2001).

Bryce, Ciaran , "Isolates: A New Approach to Multi-Programming in Java Platforms", *LogOn Technology Transfer*, Kronerg, Germany, Experts' Corner, (May 2004), 7.

Czajkowski, Grzegorz , et al., "A Multi-User Virtual Machine", Paper, Sun Microsystems Laboratories and S3 Lab, Purdue University, West Lafayette, IN, 2003, 14 pages.

Czajkowski, Grzegorz , "Multitasking Without Compromise: a Virtual Machine Evolution", Paper, Sun Microsystems Laboratories, 2001, pp. 1-14.

Dillenbeger, D. , et al., "Building a java Virtual Machine for Serve Applications: The Jvm on Os/390", IBM Systems Journal, vol. 39, No. 1, (2000), 194-210.

Doyle, Patrick , et al., "A Modular and Extensible JVM Infrastructure", Paper, Edward S. Rogers Sr. Department of Electrical and Computer Engineering, University of Toronto, Toronto, Ontario, Canada, (Jul. 2002), 14.

Dwarkadas, Sandhya , et al., "Cashmere-VLM: Remote Memory Paging for Software Distributed Shared Memory", Paper, Compaq Cambridge Research Lab, Cambridge, MA and Department of Computer Science, University of Rochester, Rochester, NY, (Apr. 1999), 7.

Ferguson, Renee B., "SAP Preps New NetWeaver Capabilities", eWeek.com, http://www.eweek.com/article2/0,1759,1668146,00.asp, (Oct. 7, 2004), 1-6.

Gontmakher, Alex , et al., "Characterizations for Java Memory Behavior", Paper, Computer Science Department, Technion, (1997), 5.

Jordan, Mick , et al., "Extending a J2EE Server with Dynamic and Flexible Resource Management", Paper, Sun Microsystems, Inc, and School of Computer Science, University of Warterloo, Waterloo, ON, Canada, (Oct. 2004), 20.

(56) References Cited

OTHER PUBLICATIONS

Jordan, Mick, et al., "Scaling J2EE Application Servers with the Multi-Tasking Virtual Machine", Paper, Sun Microsystems, SMLI TR-2004-135, Jun. 2004, pp. 1-19, Paper, Sun Microsystems, SMLI TR-2004-135, (Jun. 2004), 1-19.
Keahey, K., "A Brief Tutorial on CORBA", Keahey, K., Â?A Brief Tutorial on CORBA,Â? pp. 5,http.www.cs.indiana.edu~kksiazektuto.html.
Kuck, Norbert, et al., "SAP VM Container: Using Process Attachable Virtual Machines to Provide Isolation and Scalability for Large Servers", Article, SAP AG, Walldorf, Germany, 2002, (2002), 1-2.
Loosco, Marcelo, et al., "A New Distributed Java Virtual Machine for Cluster Computing", Notes in Computer Science, Springer-Verlag, v. 2790, (2003), 1207-1215.
Movva, Sudhir, et al., "Transparent Clustered Database Failover Using JAVA", http://www.guest-pipelines.com/newsletter-v5/0604_A.html, (Apr. 2004), 11.
Nash, Jonathan M., et al., "A Scalable Shared Queue on a Distributed Memory Machine", Scalable Systems and Algorithms Group, School of Computer Studies, The University, Leeds LS2 9JT, UK and School of Computer Studies, W. Yorkshire, UK., 13 pages.
Parnas, Dagfinn, "SAP Virtual Machine Container", http://weblogs.sdn.sap.com/pub/wlg/940, (Oct. 23, 2004), 1-4.
Polk, Jennifer, et al., "Oracle Database Net Services Administrator's Guide 10g Release 1 (10.1)", URL: http://download-west.oracle.com/docs/cd/B19306_01/network.102/b14212.pdf>; Oct. 2005; retrieved on Apr. 26, 2007, reference No. XP002431369, 1-29.
Rosenberg, David, "Bringing Java to the Enterprise: Oracle on its Java Server Strategy", IEEE Internet Computing IEEE USA, vol. 2, No. 2; Database accession No. 5902816, XP002431362; ISSN: 1089-7801, (Mar. 2, 1998), 52-59.
Surdeanu, et al., "Design and performance analysis of a distributed Java Virtual Machine", Parallel and Distributed Systems, IEEE Transactions on vol. 13, Issue 6, (Jun. 2002), pp. 611-627.
Tullman, Patrick, et al., "Janos: A Java-Oriented OS for Active Network Nodes", Paper, Flux Research Group, University of Utah, (Mar. 2001), 14.
USPTO, OA Mailed Sep. 11, 2008 for U.S. Appl. No. 11/185,199, Whole Document.
USPTO, OA Mailed Oct. 29, 2008 for U.S. Appl. No. 11/149,562, Whole Document.
USPTO, FOA Mailed Aug. 14, 2008 for U.S. Appl. No. 11/025,378, Whole Document.
USPTO, FOA Mailed Aug. 22, 2007 for U.S. Appl. No. 11/025,378, Whole Document.
USPTO, OA Mailed Jan. 21, 2009 for U.S. Appl. No. 11/025,378, Whole Document.
USPTO, OA Mailed Apr. 19, 2007 for U.S. Appl. No. 11/025,378, Whole Document.
USPTO, FOA Mailed Mar. 18, 2008 for U.S. Appl. No. 11/185,199, Whole Document.
USPTO, OA Mailed Sep. 18, 2007 for U.S. Appl. No. 11/185,199, Whole Document.
Wolf, Martin, "Administration of the SAP Web Application Server", Seminar System Modeling 2005 Hasso-Plattner-Institute for Software Systems Engineering, (2005), Whole Document.
Final Office Action for U.S. Appl. No. 11/024,924, Mailed Dec. 8, 2009, 15 Pages.
Notice of Allowance and Fees for U.S. Appl. No. 11/025,525, Mailed Dec. 21, 2010, 8 Pages.
Final Office Action for U.S. Appl. No. 11/321,326, Mailed Jan. 14, 2011, 9 Pages.
Final Office Action for U.S. Appl. No. 11/321,326, Mailed May 26, 2010, 19 Pages.
Non-Final Office Action for U.S. Appl. No. 11/025,525, Mailed Jul. 12, 2010, 16 Pages.
Non-Final Office Action for U.S. Appl. No. 11/321,326, Mailed Aug. 9, 2010, 10 Pages.
Final Office Action for U.S. Appl. No. 11/024,924, Mailed Mar. 25, 2010, 15 Pages.

Microsoft TechNet: Step-by-Step Guide to the Microsoft Management Console, Microsoft Corp, Jan. 1, 2000, pp. 1-7, www.technet.microsoft.com/en-us/library/bb742442.appx.
Final Office Action mailed Sep. 16, 2009 for U.S. Appl. No. 11/118,019.
Non-Final Office Action mailed Mar. 16, 2010 for U.S. Appl. No. 11/118,019.
Final Office Action mailed Jun. 18, 2010 for U.S. Appl. No. 11/118,019.
Final Office Action mailed Mar. 19, 2009 for U.S. Appl. No. 11/185,199.
Non-Final Office Action mailed Jun. 22, 2009 for U.S. Appl. No. 11/185,199.
Final Office Action mailed Feb. 22, 2010 for U.S. Appl. No. 11/185,199.
Non-Final Office Action mailed Aug. 30, 2010 for U.S. Appl. No. 11/185,199.
Notice of Allowance mailed Feb. 14, 2011 for U.S. Appl. No. 11/185,199.
Final Office Action mailed Feb. 27, 2009 for U.S. Appl. No. 11/221,243.
Non-Final Office Action mailed Aug. 5, 2009 for U.S. Appl. No. 11/221,243.
Non-Final Office Action mailed Jan. 28, 2010 for U.S. Appl. No. 11/221,243.
Non-Final Office Action mailed Jul. 13, 2010 for U.S. Appl. No. 11/221,243.
Notice of Allowance mailed Jan. 7, 2011 for U.S. Appl. No. 11/221,243.
Non-Final Office Action for U.S. Appl. No. 11/321,326, Mailed Apr. 14, 2011, 7 pages.
Final Office Action for U.S. Appl. No. 11/321,326, Mailed Oct. 25, 2011.
Final Office Action mailed Jul. 10, 2009 for U.S. Appl. No. 11/322,596.
Non-Final Office Action mailed Sep. 24, 2009 for U.S. Appl. No. 11/322,596.
Final Office Action mailed Apr. 28, 2010 for U.S. Appl. No. 11/322,596.
Notification of Grant mailed Dec. 12, 2011 for European Patent Application No. 06 841 110.7-221.
SAP, Virtual Machine Container: Unbreakable Java, 2003, 12 pages.
IBM Linux Scholar Challenge: Phil and Matt's, Jun. 1, 2002, IBM, pp. 1-7, Clarkson University, www.ibm.com/developerworks/ibm/library/i-clarkson/philandmatt.html.
"SAP Transactions and the VM Container & Resource Management in the VM Container", printed Sep. 12, 2009, 2 pages.
Bubak, "Hydra—Decentralized and Adaptive Approach to Distributed Computing", PARA 2000, pp. 242-249.
Silberschatz, A, et al., "Operating System Concepts", Yale University (John Wiley & Sons, Inc.) 7th Edition, pp. 131, 833 (4 pages) Dec. 2004.
Walton, Sean, Linux Threads Frequently Asked Questions (FAQ), KB1rfa, Sep. 19, 1999, pp. 1-15 (15 pages), www.linas.org/linux/threads-faq.html.
Osdir, Barracuda: Reference objects in Session/ServietContext: msg™00056; Http://osdir.com/ml/java.enhydra.barracuda.general/2002-11/msg00056.html, Nov. 2002, 6 pgs.
Office Action for U.S. Appl. No. 11/024,498 dated Apr. 1, 2008, 12 pages.
Notice of Allowance for U.S. Appl. No. 11/024,498 dated Oct. 20, 2008, 4 pages.
Notice of Allowance for U.S. Appl. No. 11/024,924 dated Dec. 15, 2011, 13 pages.
Java 2 v. 1.5.0. Class Thread. http://web.archive.org/web/20040604194528/http://java.sun.com/j2se/1.5.0/docs/api/java/lang/Thread.html, (last visited Oct. 4, 2013), pp. 1-21.
Final Office Action for U.S. Appl. No. 11/118,019 dated Aug. 18, 2010, 20 pages.
International Preliminary Report on Patentability for International Application No. PCT/EP2006/012420 dated Jul. 1, 2008, 6 pages.

(56) References Cited

OTHER PUBLICATIONS

International Search Report and Written Opinion for International Application No. PCT/EP2006/012422 dated Aug. 13, 2007, 15 pages.
International Preliminary Report on Patentability for International Application No. PCT/EP2006/012422 dated Jul. 1, 2008, 8 pages.
Bach, "The Design of the UNIX Operating System," 1986, Prentice Hall P T R, USA, 15 pages.
Doddavula, "Clustering with Tomcat," Jul. 17, 2002, retrieved from the Internet: URL:http://www.onjava.com/lpt/a/2422 [retrieved on May 28, 2013].
Viswanathan, "Load Balancing Web Applications," Sep. 28, 2001, retrieved from the Internet: URL: http://www.onjava.com/lpt/a/1228 [retrieved on May 28, 2013].
Summons to Attend Oral Proceedings Pursuant to Rule 115(1) EPC for European Application No. 06841109.9 dated Jun. 18, 2013, 11 pages.

\* cited by examiner

LOAD BALANCING ALGORITHM FOR SERVICING CLIENT REQUESTS

FIELD OF INVENTION

The field of invention pertains generally to the software arts; and, more specifically to an internetworking connection manager comprising a dispatcher capable of receiving and load balancing distribution of requests to worker processes in a connection-oriented request/response communications environment.

BACKGROUND

Even though standards-based application software (e.g., Java based application software) has the potential to offer true competition at the software supplier level, legacy proprietary software has proven reliability, functionality and integration into customer information systems (IS) infrastructures. Customers are therefore placing operational dependency on standards-based software technologies with caution. Not surprisingly, present day application software servers tend to include instances of both standard and proprietary software suites, and, often, "problems" emerge in the operation of the newer standards-based software, or interoperation and integration of the same with legacy software applications.

The prior art application server 100 depicted in FIGS. 1a,b provides a good example. FIG. 1a shows a prior art application server 100 having both an ABAP legacy/proprietary software suite 103 and a Java J2EE standards-based software suite 104. A connection manager 102 routes requests (e.g., HTTP requests, HTTPS requests) associated with "sessions" between server 100 and numerous clients (not shown in FIG. 1) conducted over a network 101. A "session" can be viewed as the back and forth communication over a network 101 between computing systems (e.g., a particular client and the server).

The back and forth communication typically involves a client ("client") sending a server 100 ("server") a "request" that the server 100 interprets into some action to be performed by the server 100. The server 100 then performs the action and if appropriate returns a "response" to the client (e.g., a result of the action). Often, a session will involve multiple, perhaps many, requests and responses. A single session through its multiple requests may invoke different application software programs.

For each client request that is received by the application server's connection manager 102, the connection manager 102 decides to which software suite 103, 104 the request is to be forwarded. If the request is to be forwarded to the proprietary software suite 103, notification of the request is sent to a proprietary dispatcher 105, and, the request itself is forwarded into a request/response shared memory 106. The proprietary dispatcher 105 acts as a load balancer that decides which one of multiple proprietary worker nodes $107_1$ through $107_N$ are to actually handle the request.

A worker node is a focal point for the performance of work. In the context of an application server that responds to client-server session requests, a worker node is a focal point for executing application software and/or issuing application software code for downloading to the client. The term "working process" generally means an operating system (OS) process that is used for the performance of work and is also understood to be a type of worker node. For convenience, the term "worker node" is used throughout the present discussion.

When the dispatcher 105 identifies a particular proprietary worker node for handling the aforementioned request, the request is transferred from the request/response shared memory 106 to the identified worker node. The identified worker node processes the request and writes the response to the request into the request/response shared memory 106. The response is then transferred from the request/response shared memory 106 to the connection manager 102. The connection manager 102 sends the response to the client via network 101.

Note that the request/response shared memory 106 is a memory resource that each of worker nodes $107_1$ through $107_L$ has access to (as such, it is a "shared" memory resource). For any request written into the request/response shared memory 106 by the connection manager 102, the same request can be retrieved by any of worker nodes $107_1$ through $107_L$. Likewise, any of worker nodes $107_1$ through $107_L$ can write a response into the request/response shared memory 106 that can later be retrieved by the connection manager 102. Thus the request/response shared memory 106 provides for the efficient transfer of request/response data between the connection manager 102 and the multiple proprietary worker nodes $107_1$ through $107_L$.

If the request is to be forwarded to the standards based software suite 104, notification of the request is sent to the dispatcher 108 that is associated with the standards based software suite 104. As observed in FIG. 1a, the standards-based software suite 104 is a Java based software suite (in particular, a Java 2 Enterprise Edition (J2EE) suite) that includes multiple worker nodes $109_1$ through $109_N$.

A Java Virtual Machine is associated with each worker node for executing the worker node's abstract application software code. For each request, dispatcher 108 decides which one of the N worker nodes is best able to handle the request (e.g., through a load balancing algorithm). Because no shared memory structure exists within the standards based software suite 104 for transferring client session information between the connection manager 102 and the worker nodes $109_1$ through $109_N$, separate internal connections have to be established to send both notification of the request and the request itself to the dispatcher 108 from connection manager 102 for each worker node. The dispatcher 108 then forwards each request to its proper worker node.

FIG. 1b shows a more detailed depiction of the J2EE worker nodes $109_1$ through $109_N$ of the prior art system of FIG. 1a. Note that each worker node has its own associated virtual machine, and, an extensive amount of concurrent application threads are being executed per virtual machine. Specifically, there are X concurrent application threads ($112_1$ through $112_X$) running on virtual machine 113; there are Y concurrent application threads ($212_1$ through $212_Y$) running on virtual machine 213; . . . and, there are Z concurrent application threads ($N12_1$ through $N12_Z$) running on virtual machine N13; where, each of X, Y and Z is a large number.

A virtual machine, as is well understood in the art, is an abstract machine that converts (or "interprets") abstract code into code that is understandable to a particular type of a hardware platform (e.g., a particular type of processor). Because virtual machines operate at the instruction level they tend to have processor-like characteristics, and, therefore, can be viewed as having their own associated memory. The memory used by a functioning virtual machine is typically modeled as being local (or "private") to the virtual machine. Hence, FIG. 1b shows local memory 115, 215, . . . N15 allocated for each of virtual machines 113, 213, . . . N13 respectively.

Various problems exist with respect to the prior art application server 100 of FIG. 1a. For example, the establishment of connections between the connection manager and the J2EE dispatcher to process a client session adds overhead/inefficiency within the standards based software suite 104.

SUMMARY

A connection manager receives client requests and dispatches the requests to worker nodes coupled by a request/response shared memory to the connection manager, according to a load balancing algorithm.

FIGURES

The present invention is illustrated by way of example and not limitation in the figures of the accompanying drawings, in which like references indicate similar elements and in which:

FIG. 1*a* shows a prior art application server;

FIG. 1*b* shows a more detailed depiction of the J2EE worker nodes of FIG. 1*a*;

FIG. 2 shows an improved application server;

FIGS. 3*a* and 3*b* show a session request and response methodology that can be performed by the improved system of FIG. 2;

Figure 6A:
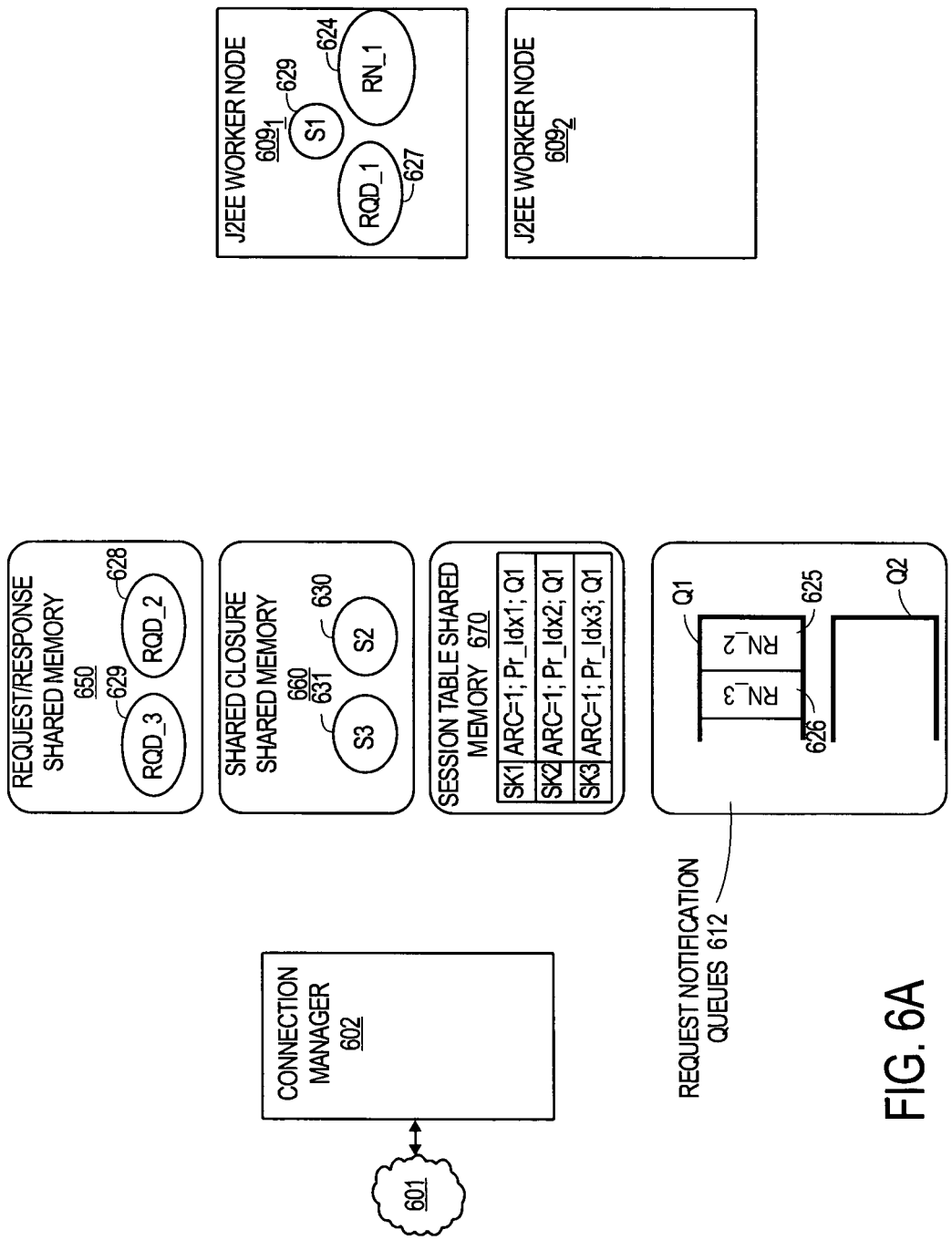
Figure 6B:
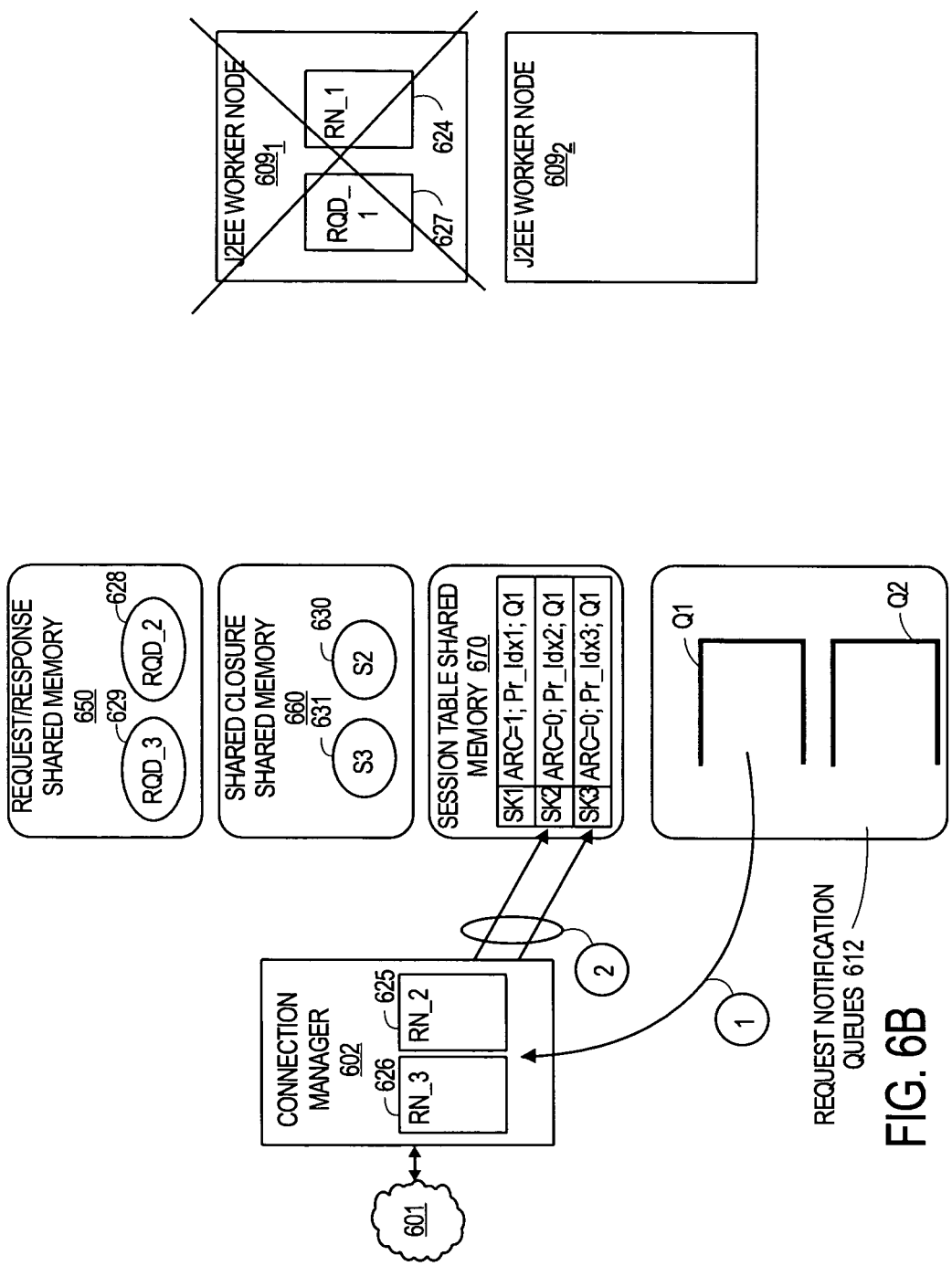
Figure 6C:
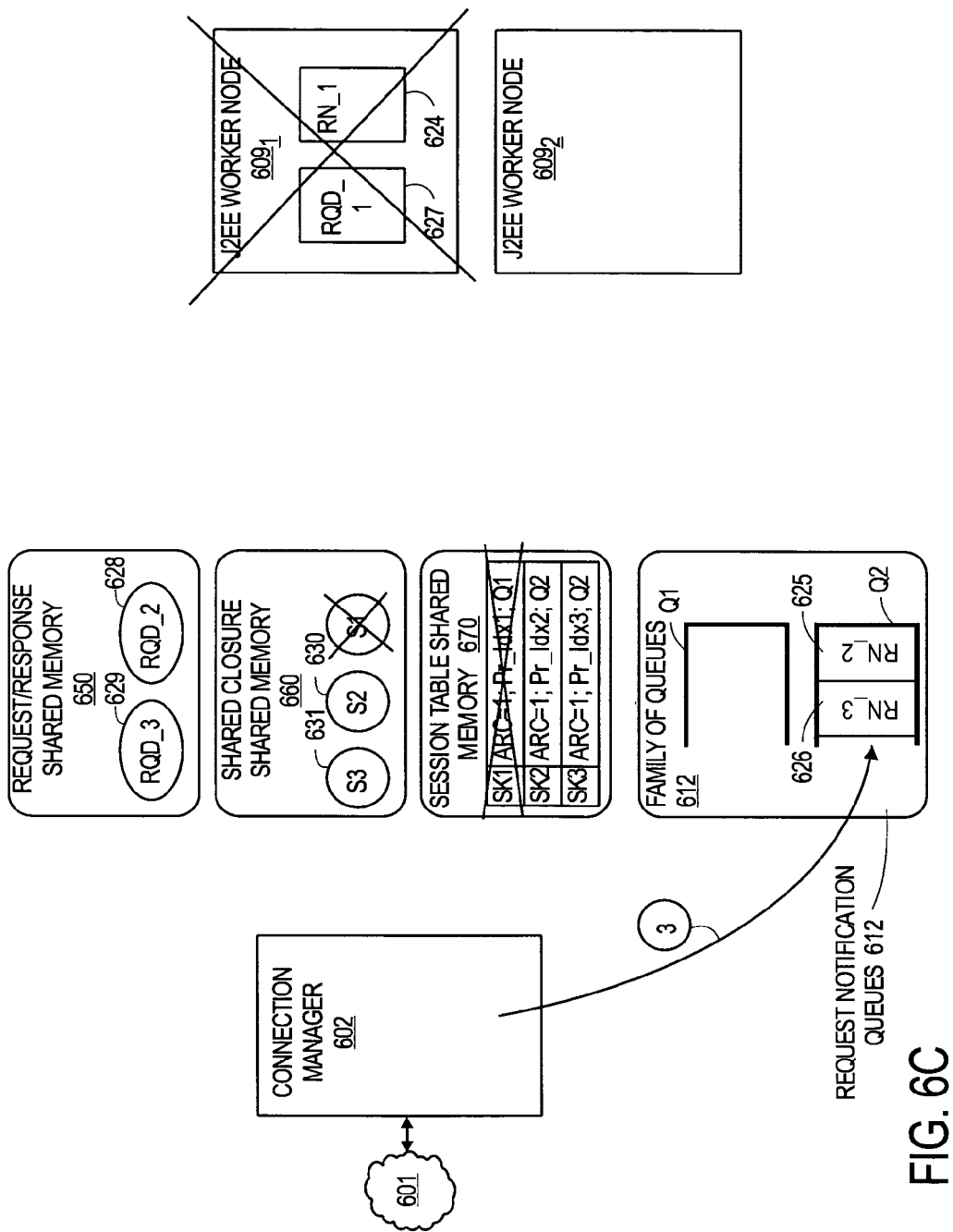
Figure 7:
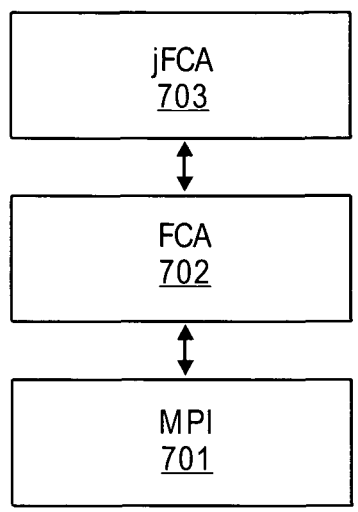
Figure 8:
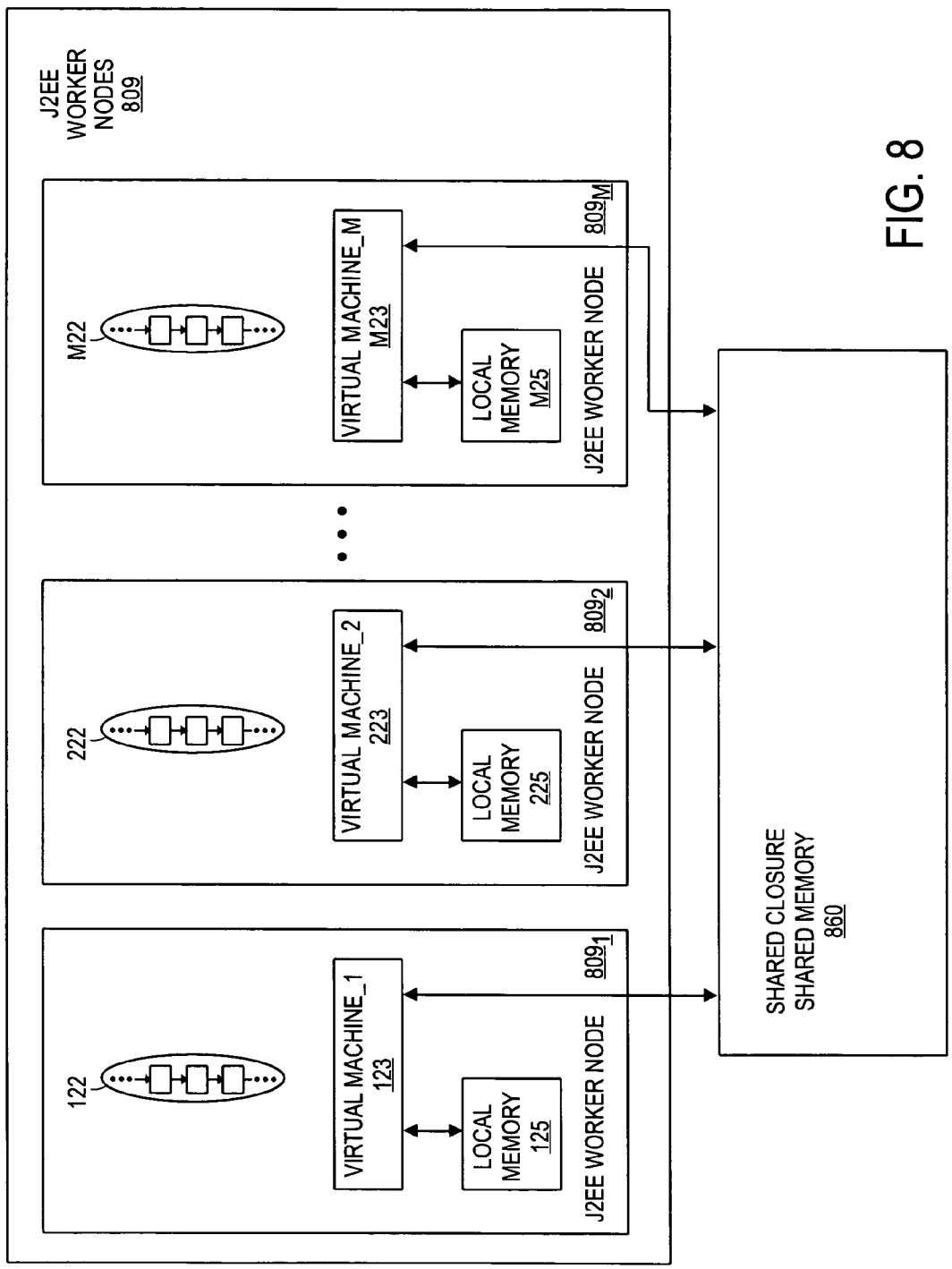
Figure 9:
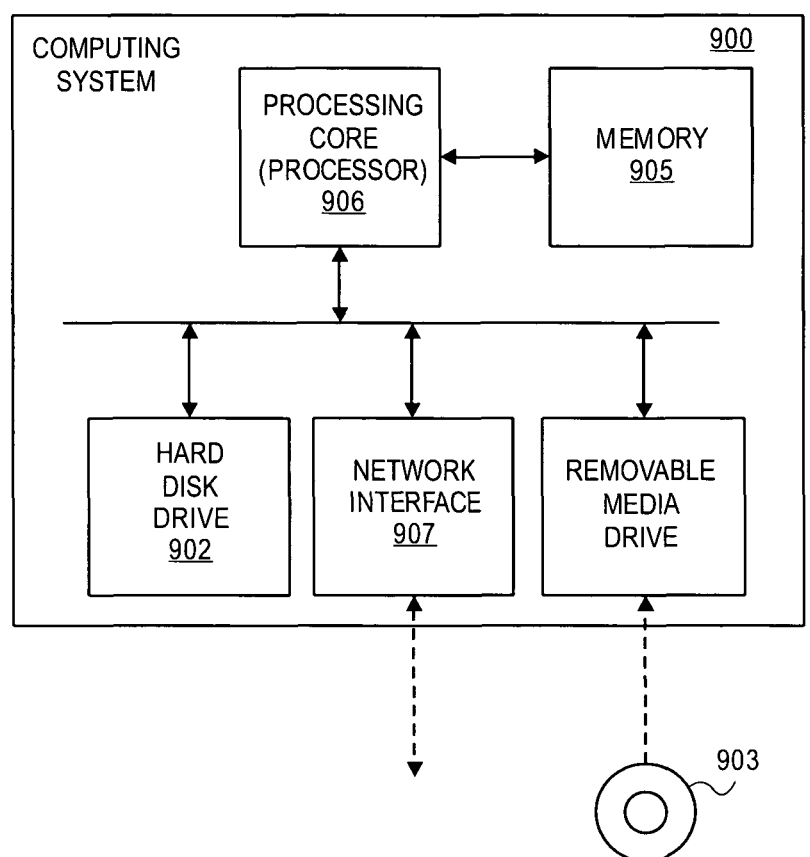

FIGS. 6*a* through 6*c* depict the rescue of a session whose request notification was targeted for a failed worker node;

FIG. 7 shows different layers of a shared memory access technology;

FIG. 8 shows a depiction of a shared closure based shared memory system;

FIG. 9 shows a depiction of a computing system.

DETAILED DESCRIPTION

1.0 Overview

Figure 2:
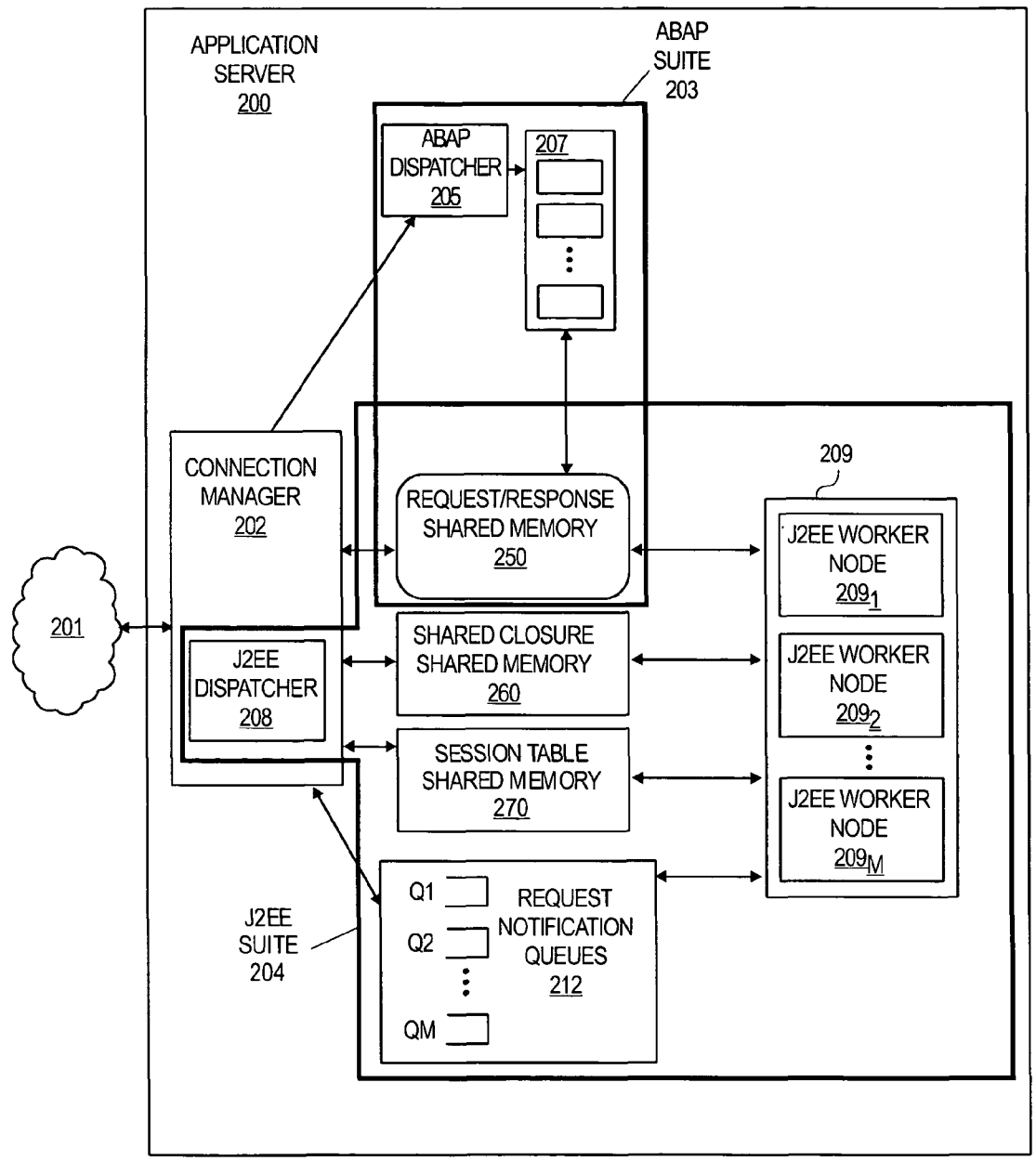

FIG. 2 shows the architecture of an improved application server in accordance with embodiments of the invention.

Figure 1A:
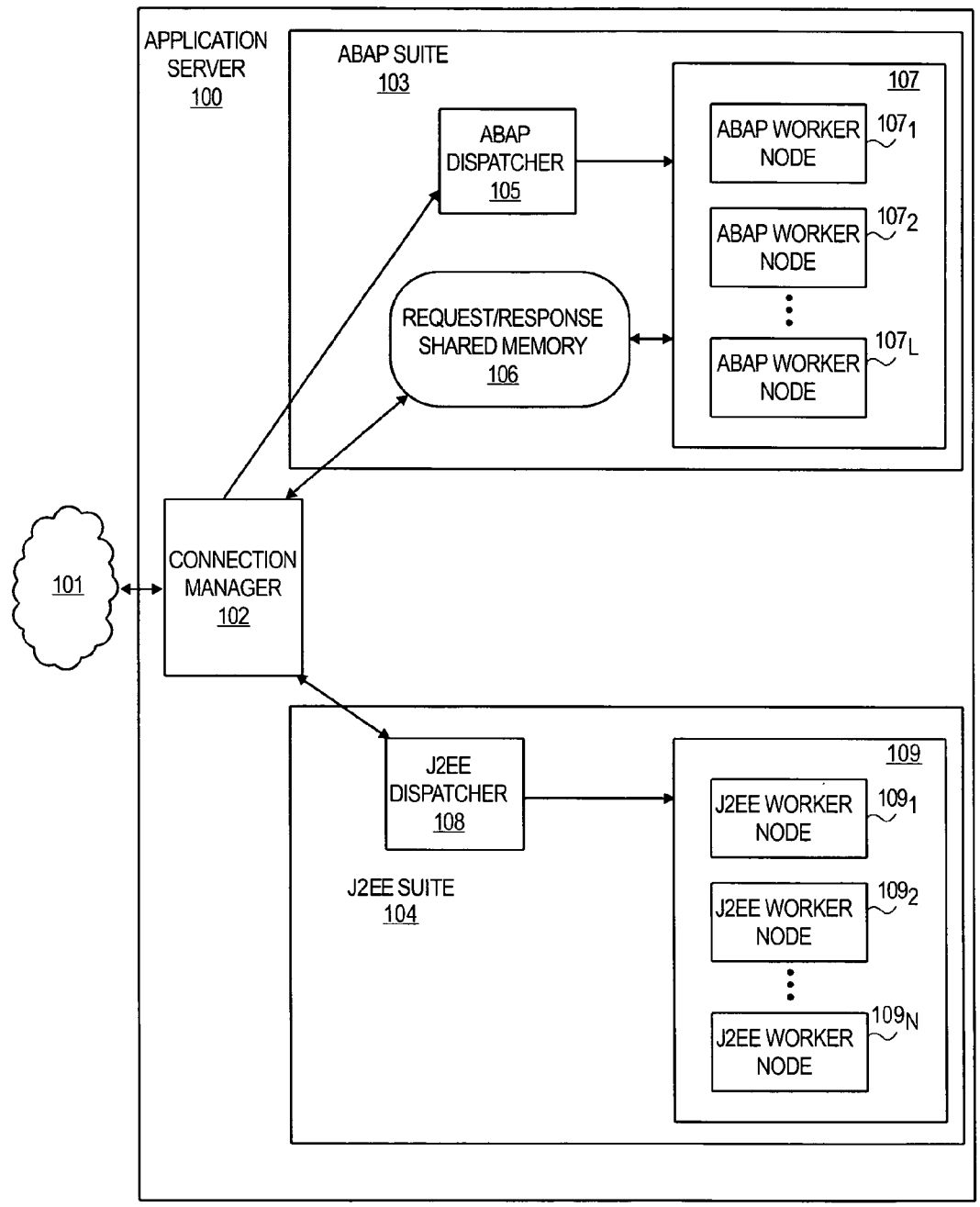

Comparing FIGS. 1*a* and 2, firstly, note that the role of the connection manager 202 has been enhanced to at least perform dispatching 208 for the standards based software suite 204 (so as to remove the additional connection overhead associated with the prior art system's standards-based software suite dispatching procedures).

Secondly, the connection manager is protocol independent. A protocol handler can be plugged into the connection manager to support any one of a number of protocols by which a request can be conveyed to the connection manager. For example, handlers for protocols such as the hypertext transfer protocol (HTTP), secure HTTP (HTTPS), simple mail transfer protocol (SMTP), network news transfer protocol (NNTP), Telnet, File Transfer Protocol (FTP), Remote Method Invocation (RMI), P4 (a proprietary protocol used by the assignee of the present invention), and T3, available from BEA Systems, Inc., may be provided at the connection manager so that it can receive a request conveyed from a client in accordance with any of these protocols.

Third, the role of a shared memory has been expanded to at least include: a) a first shared memory region 250 that supports request/response data transfers not only for the proprietary suite 203 but also the standards based software suite 204; b) a second shared memory region 260 that stores session objects having "low level" session state information (i.e., information that pertains to a request's substantive response such as the identity of a specific servlet invoked through a particular web page); and, c) a third shared memory region 270 that stores "high level" session state information (i.e., information that pertains to the flow management of a request/response pair within the application server (e.g., the number of outstanding active requests for a session)).

Third, request notification queues 212 Q1 through QM, one queue for each of the worker nodes 209$_1$ through 209$_M$ has been implemented within the standards-based software suite 204. As will be described in more detail below, the shared memory structures 250, 260, 270 and request notification queues 212 help implement a fast session fail over protection mechanism in which a session that is assigned to a first worker node can be readily transferred to a second worker node upon the failure of the first worker node.

Shared memory is memory whose stored content can be reached by multiple worker nodes. Here, the contents of the shared memory region 250 can be reached by each of worker nodes in 207 and 209. Additionally, the contents of shared memory regions 260 and 270 can be reached by each of worker nodes 209$_1$ through 209$_M$. Different types of shared memory technologies may be utilized within the application server 200 and yet still be deemed as being a shared memory structure. For example, shared memory region 250 may be implemented within a "connection" oriented shared memory technology while shared memory region 260 may be implemented with a "shared closure" oriented shared memory technology. A more thorough discussion of these two different types of shared memory implementations is provided in more detail below in section 5.0 entitled "Implementation Embodiment of Request/Response Shared Memory" and section 6.0 entitled "Implementation Embodiment of Shared Closure Based Shared Memory".

The connection oriented request/response shared memory region 250 effectively implements a transport mechanism for request/response data between the connection manager and the worker nodes. That is, because the connection manager is communicatively coupled to the shared memory, and because the shared memory is accessible to each worker node, the request/response shared memory 250—at perhaps its broadest level of abstraction—is a mechanism for transporting request/response data between the connection manager and the applicable worker node(s) for normal operation of sessions (i.e., no worker node failure) as well as those sessions affected by a worker node crash.

Although the enhancements of the application server 200 of FIG. 2 have been directed to improving the reliability of a combined ABAP/J2EE application server, it is believed that architectural features and methodologies described in more detail further below can be more generally applied to various forms of computing systems that manage communicative sessions, whether or not such computing systems contain different types of application software suites, and whether any such application software suites are standards-based or proprietary. Moreover, it is believed that such architectural features and methodologies are generally applicable regardless of any particular type of shared memory technology employed.

In operation, the connection manager 202 forwards actual request data to the first shared memory region 250 (request/response shared memory 250) regardless of whether the request is to be processed by one of the proprietary worker nodes 207 or one of the standards based worker nodes 209. Likewise, the connection manager 202 receives response data for a request from the request/response shared memory 250 whether a proprietary worker node or a standards based worker node generates the response.

With the exception of having to share the request/response shared memory 250 with the worker nodes 209 of the standards-based software suite 204, the operation of the proprietary software suite 203 is essentially the same as that described in the background, in one embodiment of the invention. That is, the connection manager 202 forwards request notifications to the proprietary dispatcher 205 and forwards the actual requests to the request/response shared memory 250. The proprietary dispatcher 205 then identifies which one of the proprietary worker nodes 207 is to handle the request. The identified worker node subsequently retrieves the request from the request/response shared memory 250, processes the request and writes the response into the request/response shared memory 250. The response is then forwarded from the request/response shared memory 250 to the connection manager 202 which then forwards the response to the client via network 201.

In an alternative embodiment, the ABAP dispatcher 205 is integrated into the connection manager, just as the J2EE dispatcher 208. Indeed, it is contemplated that a single dispatcher may encompass the functionality of both dispatchers 205 and 208. In the case where the dispatcher 205 is integrated into the connection manager 202, the connection manager identifies which one of the proprietary worker nodes 207 is to handle a request and via its integrated dispatcher capabilities, forwards the request to the request/response shared memory 250. The identified worker node subsequently retrieves the request from the request/response shared memory 250, processes the request and writes the response into the request/response shared memory 250. The response is then forwarded from the request/response shared memory 250 to the connection manager 202 who forwards the response to the client via network 201.

2.0 Processing a Request Received over a Session

Figure 3A:
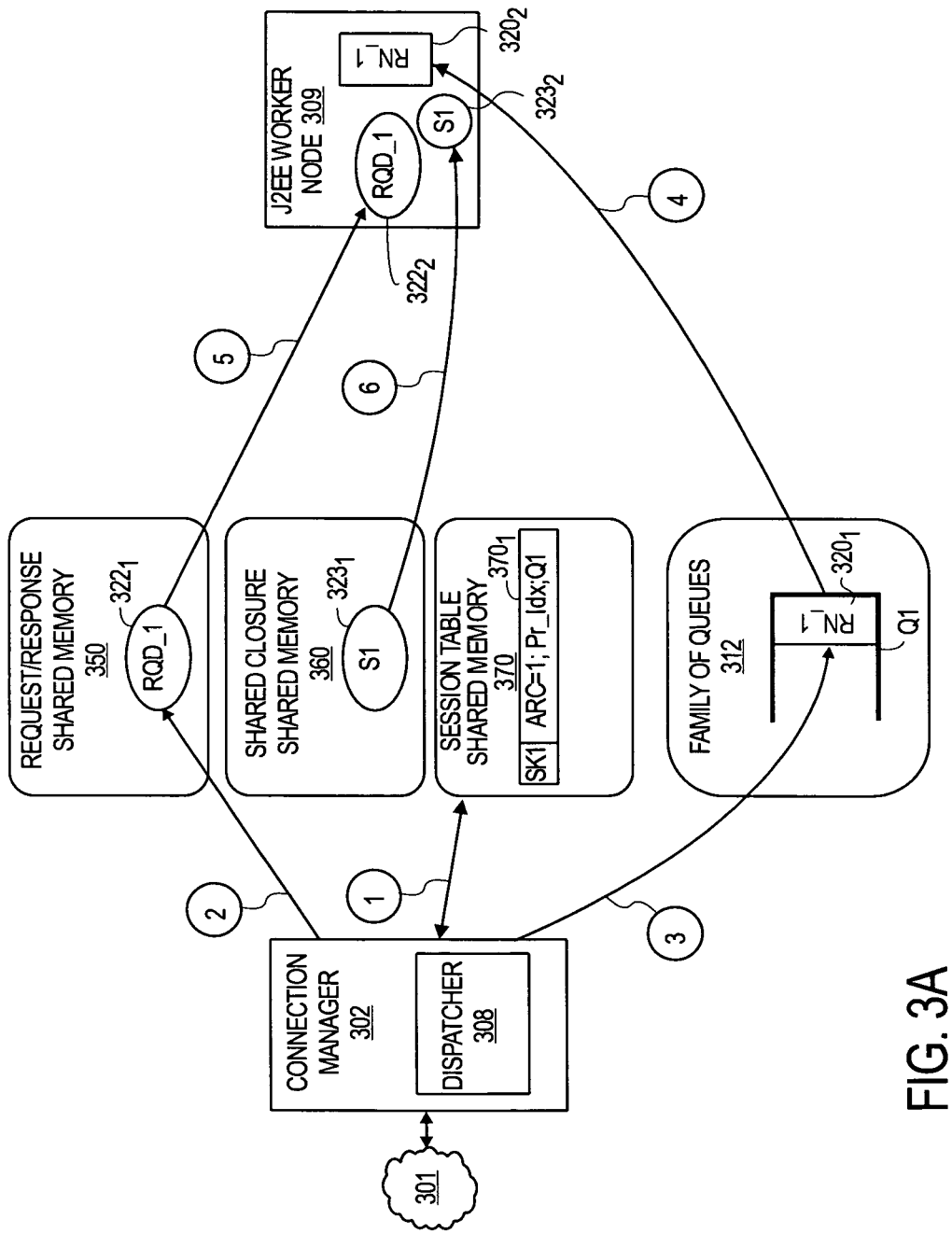
Figure 3B:
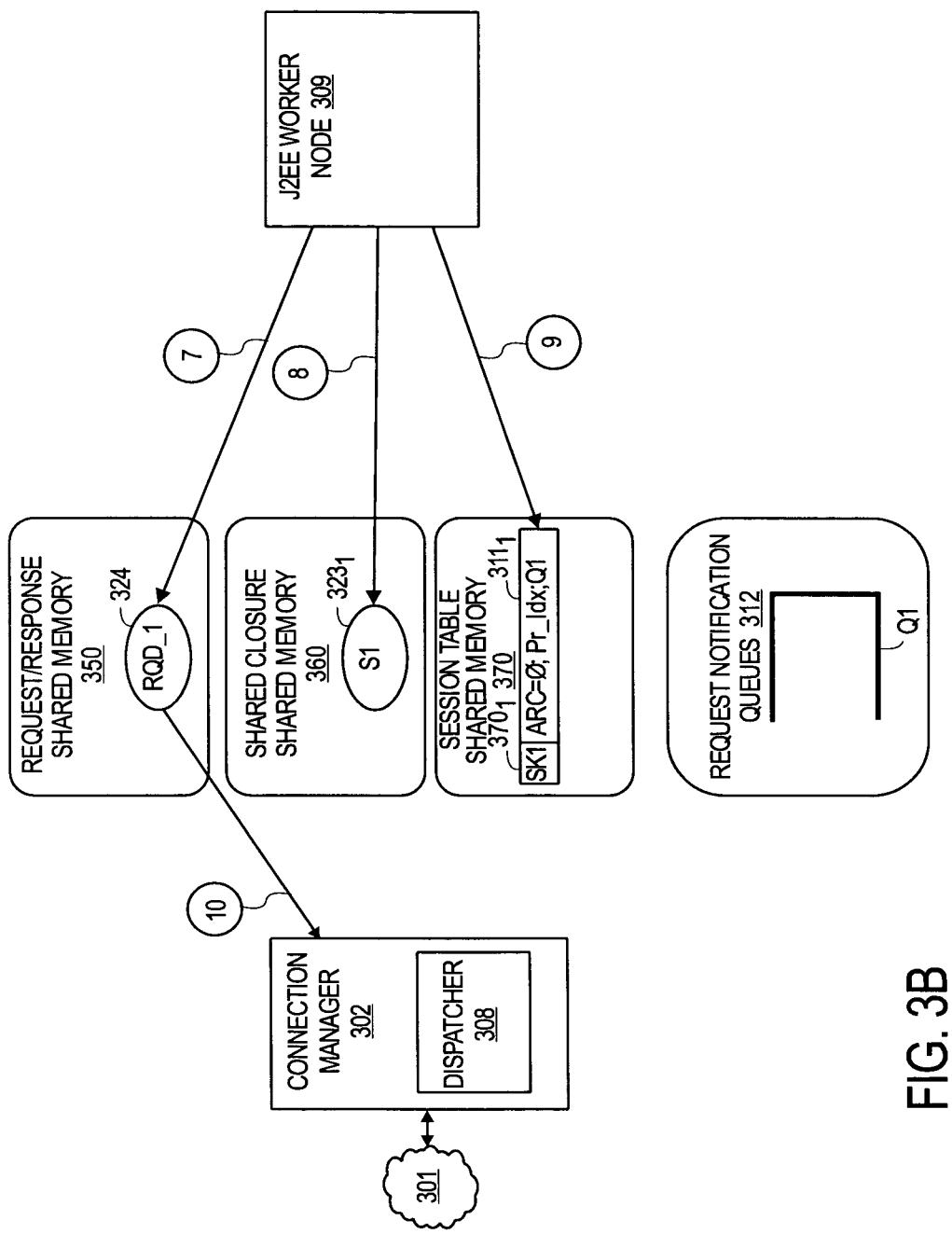

FIGS. 3a and 3b show an improved session handling flow that is used within the standards based software suite 204 of the improved application server 200 of FIG. 2. According to this flow, after the connection manager 302 receives a request from network 301 and determines that the request should be handled by the standards-based software suite, the session to which the request belongs is identified (or the request is identified as being the first request of a new session). Here, the connection manager 302 determines the existing session to which the request belongs or that the request is from a new session through well understood techniques (e.g., through a session identifier found in the header of the received request or a URL path found in the header of the received request).

Then, the dispatcher 308 for the standards-based software suite is invoked. One possible dispatching algorithm that is executed by the dispatcher 308 is described in more detail further below in Section 3.0 entitled "Dispatching Algorithm". For purposes of the present discussion it is sufficient to realize that the dispatcher 308: 1) accesses and updates at 1 "high level" state information $370_1$ for the request's session in the shared memory session table 370 (hereinafter, referred to as session table 370); 2) determines which one 309 of the M worker nodes should handle the newly arrived request; and 3) submits at 2 the request $322_1$ into the request/response shared memory 350 and submits at 3 a request notification $320_1$ for the request $322_1$ into a request notification queue Q1 that is associated with the worker node 309 selected by the dispatching algorithm. For ease of drawing, FIGS. 3a and 3b only depict the worker node 309 that has been selected by the dispatcher 308 to handle the request.

In an embodiment, there is an entry in the session table 370 for each session being supported by the M worker nodes. If the received request is for a new session (i.e., the received request is the first request of the session), the dispatcher process 308 will create at 1 a new entry $370_1$ in the session table 370 for the new session and assign at 2 one of the M worker nodes to handle the session based on a load balancing algorithm. By contrast, if the received request pertains to an already existing session, the dispatcher process 308 will access at 1 the already existing entry $370_1$ for the session and use the information therein to effectively determine the proper worker node to handle the request as well as update at 1 the session table entry $370_1$. In an embodiment, as will be described in detail further below in Section 3.0, in the case of an already existing session, the determination of the proper worker node may or may not involve the execution of a load balancing algorithm.

In an embodiment, the following items are associated with each session table entry $370_1$: 1) a "key" used to access the session table entry $370_1$ itself (e.g., session key "SK1"); 2) an active request count (ARC) that identifies the total number of requests for the session that have been received from network 301 but for which a response has not yet been generated by a worker node; 3) an identifier of the worker node 309 that is currently assigned to handle the session's requests (e.g., "Pr_Idx", which, in an embodiment, is the index in the process table of the worker node that is currently assigned to handle the session's requests); and, 4) some form of identification of the request notification queue (Q1) that provides request notifications to the worker node 309 identified in 3) above.

In a further embodiment, each entry in the session table 370 further includes: 1) a flag that identifies the session's type (e.g., as described in more detail further below in Section 4.0, the flag can indicate a "distributed" session, a "sticky" session, or a "corrupted" session); 2) a timeout value that indicates the maximum amount of time a request can remain outstanding, that is, waiting for a response; 3) the total number of requests that have been received for the session; 4) the time at which the session entry was created; and, 5) the time at which the session entry was last used.

For each request, whether a first request of a new session or a later request for an already established session, the dispatcher's dispatching algorithm 308 increments the ARC value and at 3 places a "request notification" RN_1 $320_1$, into the request notification queue Q1 that feeds request notifications to the worker node 309 that is to handle the session. The request notification RN_1 contains both a pointer to the request data RQD_1 $322_1$ in the request/response shared memory and the session key SK1 in the session table entry for the session.

The pointer to the request data in request/response shared memory 350 is generated by that portion of the connection manager 302 that stores the request data RQD_1 $322_1$ into shared memory 350 and is provided to the dispatcher 308. The pointer is used by the worker node 309 to fetch the request data RQD_1 $322_1$ from the request/response shared memory 350, and, therefore, the term "pointer" should be understood to mean any data structure that can be used to locate and fetch the request data. The worker node 309 uses the session key (or some other data structure in the request notification RN_1 that can be used to access the session table entry $370_1$ for the session) to access and decrement the ARC counter to indicate the worker node 309 has fully responded to the request for that session.

As will be described in more detail below in section 5.0 entitled "Implementation Embodiment of Request/Response Shared Memory", according to a particular implementation, the request/response shared memory 350 is connection based. Here, a connection is established between the targeted (assigned) worker node 309 and the connection manager 302 through the request/response shared memory 350 for each request/response cycle that is executed in furtherance of a particular session; and, a handle for a particular connection is used to retrieve a particular request from the request/response shared memory 350 for a particular request/response cycle. According to this implementation, the pointer in the request notification RN is the "handle" for the shared memory 350 connection that is used to fetch request data RQD_1 $322_1$. (The connection between the connection manager and the worker node established to handle a request/response cycle should not be confused with a network connection between a client over network 101 that is the source of the request and the application server).

In the case of a first request for a new session, the dispatcher 308 determines the worker node to be assigned to handle the session (e.g., with the assistance of a load balancing algorithm) and places the identity of the worker node's request notification queue (Q1) into a newly created session table entry $370_1$ for the session along with some form of identification of the worker node itself (e.g., "Pr_Idx", the index in the process table of the worker node that is currently assigned to handle the session's requests). For already existing sessions, the dispatcher 308 simply refers to the identity of the request notification queue (Q1) in the session's session table entry $370_1$ in order to determine into which request notification queue the request notification RN should be entered.

In a further embodiment, a single session can generate multiple "client connections" over its lifespan, where each client connection corresponds to a discrete time/action period over which the client engages with the server. Different client connections can therefore be setup and torn down between the client and the server over the course of engagement of an entire session. Here, depending on the type of client session, for example in the case of a "distributed" session (described in more detail further below), the dispatcher 308 may decide that a change should be made with respect to the worker node that is assigned to handle the session. If such a change is to be made the dispatcher 308 performs the following within the entry $370_1$ for the session: 1) replaces the identity of the "old" worker node with the identity of the "new" worker node (e.g., a "new" Pr_Idx value will replace an "old" Pr_Idx value); and, 2) replaces the identification of the request notification queue for the "old" worker node, e.g., with an identification of the request notification queue for the "new" worker node.

In another embodiment, over the course a single session and perhaps during the existence of a single client connection, the client may engage with different worker node applications. Here, a different entry in the session table can be entered for each application that is invoked during the session. As such, the level of granularity of a session's management is drilled further down to each application rather than just the session as a whole. A "session key" (SK1) is therefore generated for each application that is invoked during the session. In an embodiment, the session key has two parts: a first part that identifies the session and a second part that identifies the application (e.g., numerically through a hashing function).

Continuing then with a description of the present example, with the appropriate worker node 309 being identified by the dispatcher 308, the dispatcher 308 continues with the submission at 2 of the request RQD_1 $322_1$ into the request/response shared memory 350 and the entry at 3 of a request notification RN_1 $320_1$ into the queue Q1 that has been established to supply request notifications to worker node 309. The request notification RN_1 $320_1$ sits in its request notification queue Q1 until the targeted worker node 309 foresees an ability (or has the ability) to process the corresponding request $322_1$. Recall that the request notification RN_1 $320_1$ includes a pointer to the request data itself RQD_1 $322_1$ as well as a data structure that can be used to access the entry $370_1$ in the session table (e.g., the session key SK1).

Comparing FIGS. 2 and 3a, note that with respect to FIG. 2 a separate request notification queue is implemented for each worker node (that is, there are M queues, Q1 through QM, for the M worker nodes $209_1$ through $209_M$, respectively). As will be described in more detail below with respect to FIGS. 5a,b and 6a-c, having a request notification queue for each worker node allows for the "rescue" of a session whose request notification(s) have been entered into the request notification queue of a particular worker node that fails ("crashes") before the request notification(s) could be serviced from the request notification queue.

When the targeted worker node 309 foresees an ability to process the request $322_1$, it looks to its request notification queue Q1 and retrieves at 4 the request notification RN_1 $320_1$ from the request notification queue Q1. FIG. 3a shows the targeted worker node 309 as having the request notification RN_1 $320_2$ to reflect the state of the worker node after this retrieval at 4. Recalling that the request notification RN_1 $320_1$ includes a pointer to the actual request RQD_1 $322_1$ within the request/response shared memory 350, the targeted worker node 309 subsequently retrieves at 5 the appropriate request RQD_1 $322_1$ from the request/response shared memory 350. FIG. 3a shows the targeted worker node 309 as having the request RQD_1 $322_2$ to reflect the state of the worker node after this retrieval at 5. In an embodiment where the request/response shared memory is connection oriented, the pointer to RQD_1 $322_1$ is a "handle" that the worker node 309 uses to establish a connection with the connection manager 302 and then read at 5 the request RQD_1 $322_1$ from the request/response shared memory.

The targeted worker node 309 also assumes control of one or more "session" objects S1 $323_2$ used to persist "low level" session data. Low level session data pertains to the request's substantive response rather than its routing through the application server. If the request is the first request for a new session, the targeted worker node 309 creates the session object(s) S1 $323_2$ for the session; or, if the request is a later request of an existing session, the targeted worker node 309 retrieves at 6 previously stored session object(s) S1 $323_1$ from the "shared closure" memory region 360 into the targeted worker node $323_2$. The session object(s) S1 $323_1$ may be implemented as a number of objects that correspond to a "shared closure". A discussion of shared closures and an implementation of a shared closure memory region 360 is provided in more detail further below in section 6.0 entitled "Implementation Embodiment of Shared Closure Based Shared Memory"

With respect to the handling of a new session, the targeted worker node 309 generates a unique identifier for the session object(s) S1 $323_1$ according to some scheme. In an embodiment, the scheme involves a random component and an identifier of the targeted worker node itself 309. Moreover, information sufficient to identify a session uniquely (e.g., a sessionid parameter from a cookie that is stored in the client's browser or the URL path of the request) is found in the header of the request RQD_1 $322_2$ whether the request is the first request of a new session or a later requests of an existing session. This information can then be used to fetch the proper session object(s) S1 $323_1$ for the session.

FIG. 3b depicts the remainder of the session handling process. With the targeted worker node 309 having the request RQD_1 $322_2$ and low level session state information via session object(s) S1 $323_2$, the request is processed by the targeted worker node 309 resulting in the production of a response 324 that is to be sent back to the client. The worker node 309 writes at 7 the response 324 into the response/request shared memory 350; and, if a change to the low level session state information was made over the course of generating the response, the worker node 309 writes at 8 updated session object(s) into the shared closure memory 360. Lastly, the worker node 309 decrements at 9 the ARC value (311) in the session table entry $370_1$ to reflect the fact that the response process has been fully executed from the worker node's perspective and that the request has been satisfied. Here, recall that a segment of the request notification RN_1 $320_2$ (e.g., the session key SK1) can be used to find a "match" to the correct entry $370_1$ in the session table 370 in order to decrement the ARC value for the session.

In reviewing the ARC value across FIGS. 3a and 3b, note that it represents how many requests for the session the connection manager has received from network 301 but for which no response has yet been generated by a worker node. In the example provided with reference to FIGS. 3a and 3b only one request is outstanding at any one point in time, hence, the ARC value never exceeds a value of 1. Conceivably, multiple requests for the same session could be received from network 301 prior to any responses being generated. In such a case the ARC value will indicate the number of requests that is queued or is currently being processed by one or more worker nodes but for which no response has been generated.

After the response 324 is written at 7 into the request/response shared memory 350, it is retrieved at 10 into the connection manager 302 which then sends it to the client over network 301.

2.1 Processing of a Request Received over a Multiplexed Session

Recall that one or more request/response messages may be transmitted in a session between a client and server. In one embodiment of the invention, it is contemplated that the session is logically divided into multiple communication channels, so that multiple independent request/response messages may be transmitted over each channel of the session in service of different entities, in accordance with a "message-oriented" or "session multiplexing" protocol. An example of such a protocol is the Blocks Extensible Exchange Protocol (BEEP), a generic application protocol for connection-oriented, request-response interactions such as described herein. (Further information regarding the BEEP may be found in Internet Engineering Task Force (IETF) Request for Comments (RFC) 3080, entitled The Blocks Extensible Exchange Protocol Core, November, 2001). It should be appreciated that other such application protocols may equally be used in this embodiment of the invention.

For example, two entities, e.g., separate clients, or separate applications running on the same client, may transmit requests to a server over the network. The connection manager receives such requests, and rather than establishing a separate session for transmitting requests/responses between one entity and a worker node, and establishing another session for transmitting request/responses between the other entity and the same worker node, the connection manager establishes a single session for transmitting requests/responses between both entities and the worker node. Doing so reduces the number of sessions that need to be maintained by the connection manager, which reduces the processing and system resources associated with maintaining the sessions. Additionally, time is saved not having to establish a new, separate session for each independent exchange of messages. Importantly, in order to differentiate between messages transmitted over one channel versus another channel of a session each message includes a unique channel identifier in addition to the message data.

The channel identifier in each message transmitted over the same session provides for the separation of messages into different channels. Messages for different channels of the same session may be transmitted in an interleaved fashion over the network to the connection manager. The connection manager, then, is responsible for deinterleaving the messages received over a session based on the channel identifier included in the message header.

Recall that the connection manager is protocol independent. A protocol handler can be plugged into the connection manager to support any one of a number of protocols that make use of a session multiplexing protocol to communicate with different entities over the same session, so that the connection manager can receive requests conveyed from a client in accordance with any of these communication protocols. Examples of such protocols include P4, available from the assignee of this invention, and T3, available from BEA Systems, Inc.

Processing a request received over a multiplexed session is described below with reference to FIGS. 3a and 3b. First, in this embodiment of the invention, the session table shared memory 370 provides a separate entry for each application session and channel combination, that is, a separate session key SK1 is generated for each application channel that is invoked during the session. In an embodiment, the session key has two parts: a first part that identifies the session, and a second part that identifies the channel, over which a request is received.

After the connection manager 302 receives a request from network 301 and determines that software suite 204 should handle the request, the session and the channel to which the request belongs are identified, for example, through a session identifier or URL path, and a channel identifier, located in the header of the received request. The dispatcher 308 accesses and updates at 1 the information $370_1$ for the request's session and channel in the session table 370, determines the worker node 309 to handle the request, submits at 2 the request data RQD_1 $322_1$ into the request/response shared memory 350, and submits at 3 a request notification $320_1$ for the request $322_1$ into a request notification queue Q1 associated with the selected worker node 309.

If the received request is for an existing session and channel, the dispatcher 308 accesses at 1 the existing entry $370_1$ to select the worker node to handle the request and to update at 2 the entry $370_1$. The dispatcher 308 increments the ARC value and at 3 places a "request notification" RN_1 $320_1$, into the request notification queue Q1 for the selected worker node 309. The pointer and session key included in the request notification are used by the worker node 309 to fetch the request data RQD_1 $322_1$ from the request/response shared memory 350 and to access and decrement the ARC counter once to indicate the response has been created and sent back to the connection manager. If the received request is for a new session and channel, or for a new channel of an existing session, the dispatcher 308 creates at 1 a new entry $370_1$ in the session table 370 for the new session/channel and assigns at 2 the worker node to handle the session/channel. The dispatcher 308 places the identity of the worker node's request notification queue (Q1) into the new entry $370_1$ for the session and channel along with an identification of the worker node (e.g., "Pr_Idx").

In another embodiment, during the existence of a channel or even during the existence of a client connection over such channel (that is, during a request/response message cycle between the client and server over a particular channel), the client may engage with different worker node applications applications. A different entry in the session table may be provided for each application invoked. In such an embodiment, the session key has three parts: session identifier, channel identifier, and an application identifier.

With reference to FIG. 3A, when the targeted worker node 309 is ready to process the request $322_1$, it retrieves at 4 the request notification RN_1 $320_1$ from its request notification queue Q1. The targeted worker node 309 subsequently retrieves at 5 the appropriate request data RQD_1 $322_1$ from the request/response shared memory 350, pointed to by the pointer in the request notification RN_1 $320_1$. Information sufficient to uniquely identify a session and channel is obtained from the header of the request RQD_1 $322_2$. This information is used, among other tasks, to fetch the proper session object(s) S1 $323_1$ for the session and channel.

FIG. 3b depicts the response process. The targeted worker node 309 processes the request and generates a response 324 to the client. The worker node 309 writes at 7 the response 324 into the response/request shared memory 350; and writes at 8 updated session object(s) into the shared closure memory 360, if any. Finally, the worker node 309 decrements at 9 the ARC value (311) in the session table entry $370_1$ to reflect the fact that the request is satisfied. The session key portion SK1 of request notification RN_1 $320_2$ is used to find the correct entry $370_1$ in the session table 370 in order to decrement the ARC value for the session/channel.

After the response 324 is written at 7 into the request/response shared memory 350, it is retrieved at 10 into the connection manager 302 which then sends it to the client over the network 301.

3.0 Dispatching Algorithm

Recall from the discussions of FIGS. 2 and 3a,b that the connection manager 202, 302 includes a dispatcher 208, 308 that executes a dispatching algorithm for requests that are to be processed by any of the M worker nodes 209. In one embodiment of the invention, the connection manager includes ABAP dispatcher 205 as well, and executes a dispatching algorithm for requests that are to be processed by any of the N worker nodes 207. In an alternative embodiment, the dispatchers 205 and 208 may be combined into one dispatcher in connection manager 202, in which case the combined dispatcher executes a dispatching algorithm for requests that are to be processed by any of the N worker nodes 207 or M worker nodes 209.

Figure 4:
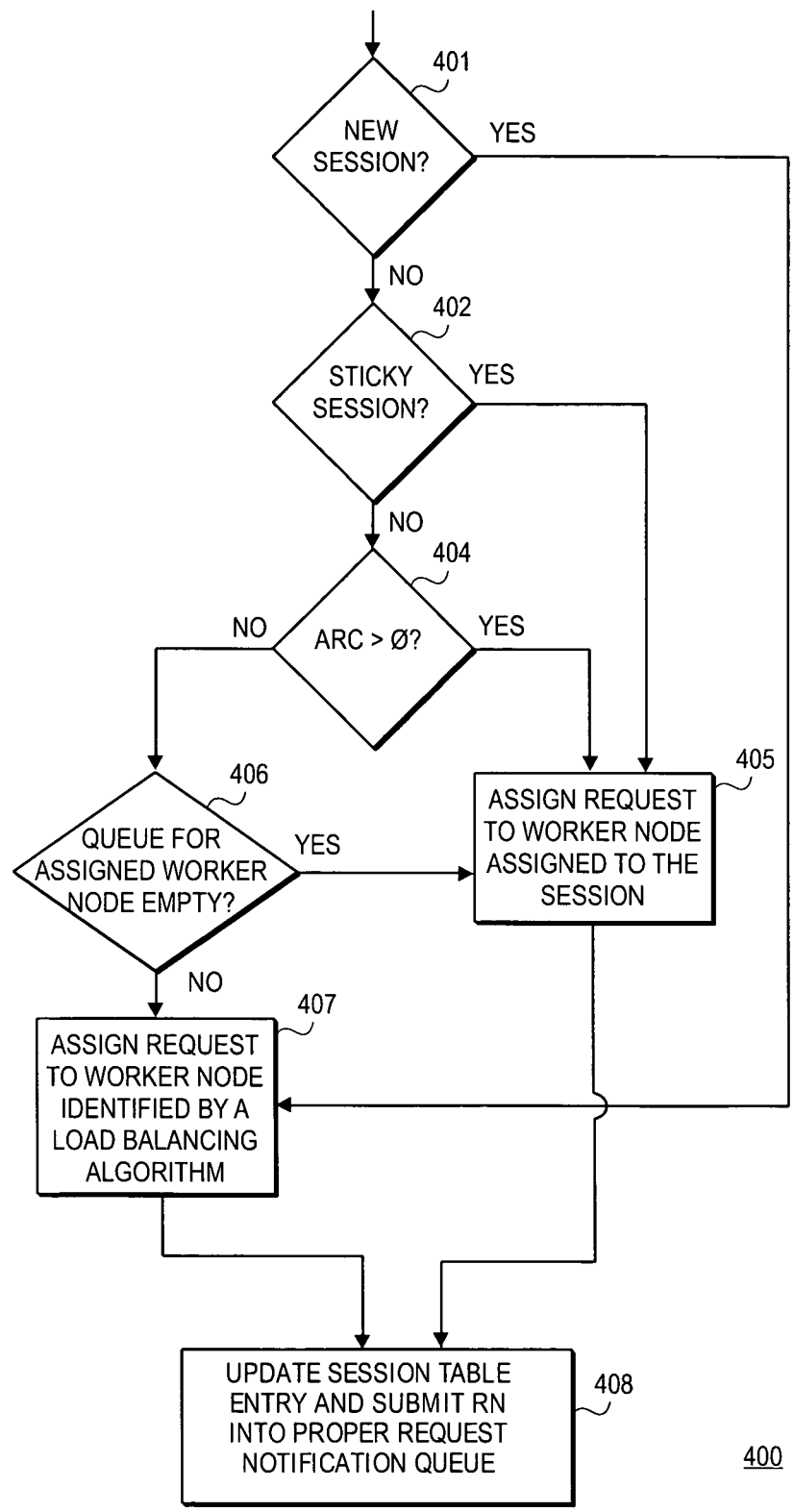
FIG. 4 shows a dispatching methodology.

FIG. 4 shows an embodiment 400 of a dispatching algorithm that can be executed by the connection manager. The dispatching algorithm 400 of FIG. 4 contemplates the existence of two types of sessions: 1) "distributable"; and, 2) "sticky".

A distributable session is a session that permits the handling of its requests by different worker nodes over the course of its regular operation (i.e., no worker node crash). A sticky session is a session whose requests are handled by only one worker node over the normal course (i.e., no worker node crash) of its operation. That is, the sticky session "sticks" to the one worker node. According to an implementation, each received request that is to be processed by any of worker nodes 209 is dispatched according to the process 400 of FIG. 4.

Before execution of the dispatching process 400, the connection manager 202, 302 will determine: 1) whether the request is the first request for a new session or is a subsequent request for an already existing session (e.g., in the case of the former, there is no "sessionID" from the client's browser's cookie in the header of the request, in the later case there is a such a "sessionID"); and, 2) the type of session associated with the request (e.g., sticky or distributable). In an embodiment, the default session type is "distributable" but can be changed to "sticky", for example, by the worker node that is presently responsible for handling the session.

In the case of a first request for a new session 401, a load-balancing algorithm 407 (e.g., round robin based, weight based (e.g., using the number of active (not yet services) request notifications as weights)) determines which one of the M worker nodes is to handle the request. The dispatching process then writes 408 a new entry for the session into the session table that includes: 1) the sticky or distributable characterization for the session; and, 2) an ARC value of 1 for the session, indicating one request needs to be responded to; 3) some form of identification of the worker node that has been targeted; and, 4) the request notification queue for the worker node identified by 3). In a further embodiment, the session key described above is also created for accessing the newly created entry. In one embodiment, the session key may be created from information found in the header of the received request.

At 401, if the request is not a first request for a new session, whether the received request corresponds to a sticky or distributable session is determined by reference to the session table entry for the session. If it is determined at 402 that the session is a sticky session, the request is assigned to the worker node that has been assigned at 405 to handle the session to which the request belongs. According to the embodiment described with respect to FIGS. 3a,b, the identity of the request notification queue (e.g., Q1) for the targeted worker node is listed in the session table entry for the session (note that that the identity of the worker node that is listed in the session table entry could also be used to identify the correct request notification queue).

The ARC value in the session's session table entry is then incremented and the request notification RN for the session is entered into the request notification queue for the worker node assigned to handle the session at 408. Recall that the request notification RN includes both a pointer to the request in the request/response shared memory as well as a pointer (or data structure that can be used by the targeted worker node) to access the correct session table entry. The former may be provided by the functionality of the connection manager that stores the request into the request/response shared memory and the later may be the session key.

If at 402 it is determined the session is a distributable session, and if at 404 the ARC value obtained from the session's session table entry is greater than zero, the request is assigned at 405 to the worker node that has been assigned to handle the session. Here, an ARC value greater than zero means there still exists at least one previous request for the session for which a response has not yet been generated. The ARC value for the session is then incremented in the session's session table entry and the request notification RN for the session is directed to the request notification queue for the worker node assigned to handle the session.

If at 404 the ARC value is zero, and if at 406 the request notification queue for the assigned worker node is empty, the request is assigned at 405 to the worker node that has been assigned to handle the session. This action essentially provides an embedded load balancing technique. Since the request notification queue is empty for the worker node that has been assigned to handle the session, the latest request for the session may as well be given to the same worker node. The ARC value for the session is then incremented in the session's session table entry and the request notification RN for the session is directed to the request notification queue for the worker node assigned to handle the session at 408.

Returning to 404, if the ARC value is zero, but the request notification queue for the previously assigned worker node is determined at 406 to be not empty (for example, a multithreaded worker node could be processing requests for other threads), the request is assigned to a new worker node 407 (for example, through a load balancing algorithm). In this case, while there are no requests waiting for a response for the session (i.e., ARC=0), the worker node assigned to the session has some backed-up traffic in its request notification queue, and the session is distributable. As such, to improve overall efficiency, the request can be assigned to a new worker node that is less utilized than the previous worker node assigned to handle the session.

The ARC value for the session is incremented in the session's session table entry and the request notification RN for the session is directed to the request notification queue for the new worker node that has just been assigned to handle the session 408.

The above description of the dispatching algorithm assumes a single session for handling related requests/responses. In an alternative embodiment, wherein multiplexed sessions are used as described in section 2.1 above, it is appreciated the dispatcher receives and processes independent and simultaneous requests received via separate channels of a session, and therefore considers a request's channel identifier in addition to it's session identifier when selecting the appropriate worker node to process the request in accordance with process 400.

3.1 Dispatcher Load Balancing Algorithm

With respect to FIG. 4, if a first request for a new session 401 is received, a load-balancing algorithm 407 determines which one of the M worker nodes is to handle the request, in one embodiment of the invention using a round robin or weight-based algorithm. In one embodiment of the invention, if a request is received for an existing distributable session at 402, and there are no active requests outstanding for the session (i.e., there are no previous requests for which a response has yet to be generated for the session, as determined by an ARC value of zero for the session in the session table entry) at 404, and the request notification queue for the worker node assigned to the session is empty (i.e., there are no request notifications in the queue, indicating that the worker node assigned to handle the existing session is at least not backed up with outstanding requests, and may be, at best, idle) at 406, then an implicit load balancing occurs wherein the request for the existing session is directed to the worker node assigned to handle the session, at 405

In one embodiment, a worker node assigned to an existing session may be said to be "available" when, at a minimum, an active request for the session is not pending (i.e., the ARC count for the existing session is zero) for the worker node assigned to handle the session. Taking the notion of "availability" one step further, in another embodiment, an existing session may be said to be "available" when an active request for the session is not pending and the request notification queue for the worker node responsible for handling the existing session contains no request notifications.

Alternatively, availability may be determined by comparing the number of active requests for a session (i.e., the ARC value for a session) with a threshold number N (e.g., a worker node is available if the number of active requests for an existing session that it is being handling by the worker node is less than the threshold (i.e., N>ARC, where N is a positive integer)). The threshold could be an absolute number, or a relative number compared to other worker nodes (i.e., the worker node has fewer active requests pending that other worker nodes in the application server). Other factors could also play a role in examining availability of a worker node to handle a request for an existing session that it is assigned to handle, for example, whether the worker node has any active threads, and if so, how many, or conversely, whether the worker node has at least one or more idle threads. Again, the number of threads could be examined on a absolute basis, or relative basis against other worker nodes.

In short, in one embodiment, the dispatcher sends a request for an existing distributable session to an available worker node assigned to handle the session. However, if the worker node is busy, i.e., if there is at least one active request pending for the session the worker node is handling and the worker node's request queue contains at least one request notification, or if the worker node is not "available" as defined therein, the dispatcher performs load balancing to select or assign the request to another worker node, according to one of the embodiments that follows.

Load balancing may be performed at 407 by the dispatcher in accordance with a round robin algorithm. The ICM maintains a list of active server nodes, for example, in a doubly-linked list or a ring data structure. Each entry in the list contains, in addition to a reference to each worker node 309, e.g., worker node name, a reference to the request notification queue associated with the worker node in the family of queues 312. A current pointer in the list identifies a node for selection. The dispatcher selects the worker node to which to assign the request based on the current pointer, and then moves the current pointer to the next entry in the list. When the current pointer points to a node at an end of the list, after selecting the worker node, the dispatcher moves the pointer to the a beginning of the list.

In another embodiment, load balancing may be performed at 407 by the dispatcher in accordance with a weighted algorithm. As above for the round robin embodiment, the ICM maintains a list of active server nodes, for example, in a doubly-linked list or a ring data structure. Each entry in the list contains, in addition to a reference to each worker node 309, e.g., worker node name, a reference to the request notification queue associated with the worker node in the family of queues 312. According to this embodiment, the dispatcher chooses the worker node with the fewest number of request notifications 320 in its associated request notification queue. The dispatcher traverses the list and chooses the first worker node with an empty request notification queue, or if there is no worker node with an empty request notification queue, the dispatcher selects the worker node with the lowest number of request notifications. If there is a tie among worker nodes, that is, if two or more worker nodes have the same lowest number of request notifications in their associated request notification queues, the dispatcher selects the first such worker node in the list.

If the dispatcher selects a worker node with an empty associated request notification queue, the dispatcher then moves the current pointer to the next worker node in the list since the worker node just selected may well be processing the request when a subsequent request is received by the ICM. Thus, the dispatcher's search for an available worker node will start with the next worker node in the list. On the other hand, if the dispatcher selects a worker node with a nonempty request notification queue (because there are no worker nodes with an empty request notification queue), then the dispatcher does not move the current pointer to the next worker node in the list since all worker nodes may well be processing a request when a subsequent request is received by the ICM.

In another embodiment, a thread monitoring shared memory provides information regarding the state of threads for each worker node whose request notification queue is empty. Given this additional information, the dispatcher may select a worker node other than simply the first worker node in the list with an empty request notification queue. For example, the dispatcher may select a worker node with an empty request notification queue and that has at least one idle thread. Likewise, if there are no worker nodes with empty queues, and at least two worker nodes with the same number of request notifications in their respective associated queues (i.e., a tie), the dispatcher may select the worker node that has at least one idle thread.

Given the shared memory architecture, the request notification queue producer can spy or peer into the request notification queues and examiner whether a consumer—a worker node—has removed a request notification from the queue without having to communicate with that worker node. Additionally, housekeeping information about the queues are kept in shared memory, and the queue producer can access this information as well, whether in a list or an array, and examine whether the attributes of a particular queue indicate whether the queue is empty.

4.0 Rescuing Sessions Targeted for a Failed Worker Node

Figure 5:
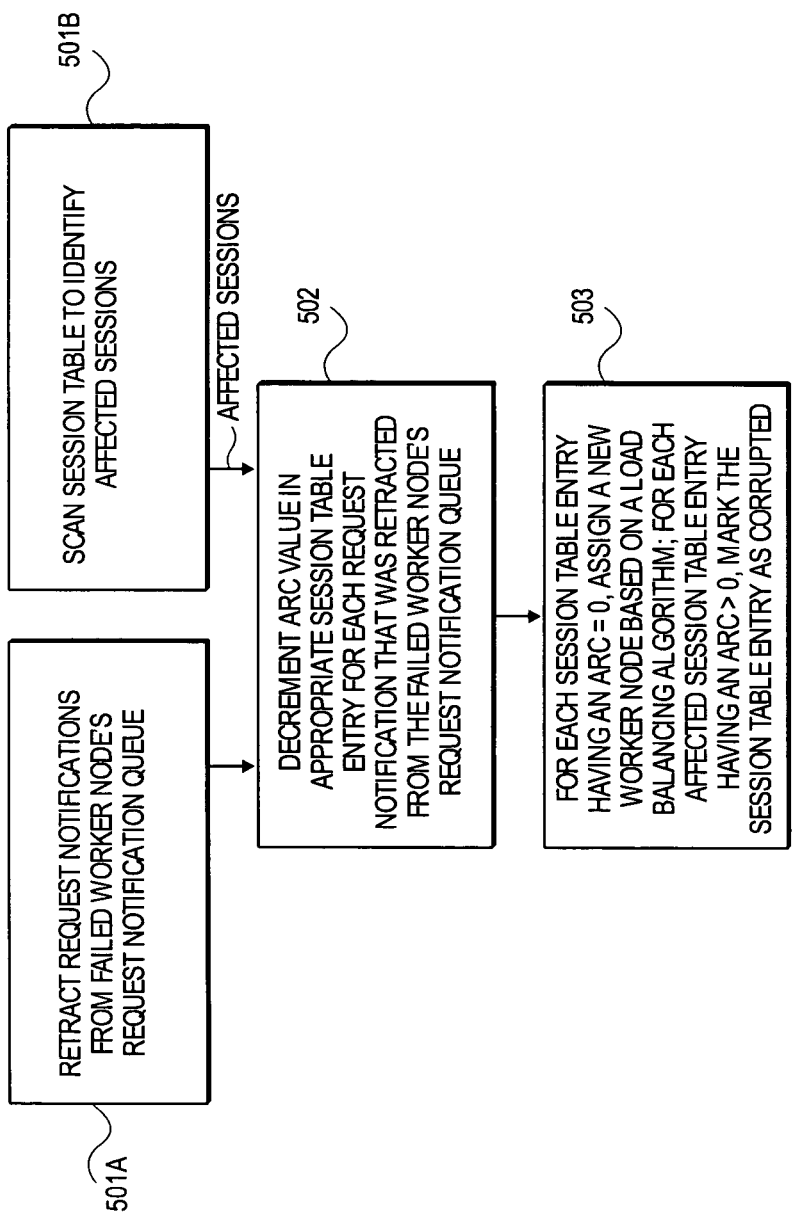
FIG. 5 shows a methodology for rescuing sessions that have been targeted for a failed worker node.

FIGS. 5 and 6*a,b,c* together describe a scheme for rescuing one or more sessions whose request notifications have been queued into the request notification queue for a particular worker node that crashes before the request notifications are serviced from the request notification queue. FIG. 6*a* shows an initial condition in which worker nodes $609_1$ and $609_2$ are both operational. A first request 627 (whose corresponding request notification is request notification 624) for a first session is currently being processed by worker node $609_1$. As such, the session object(s) 629 for the first session is also being used by worker node $609_1$.

Request notifications 625, 626 are also queued into the request notification queue Q1 for worker node $609_1$. Request notification 625 corresponds to a second session that session table 670 entry SK2 and request 628 are associated with. Request notification 626 corresponds to a third session that session table entry SK3 and request 629 are associated with.

FIG. 6*b* shows activity that transpires after worker node $609_1$ crashes at the time of the system state observed in FIG. 6*a*. Because request notifications 625 and 626 are queued within the queue Q1 for worker node $609_1$ at the time of its crash, the second and third sessions are "in jeopardy" because they are currently assigned to a worker node $609_1$ that is no longer functioning. Referring to FIGS. 5 and 6*b*, after worker node $609_1$ crashes, each un-serviced request notification 625, 626 is retracted 501*a*, 1 from the crashed worker node's request notification queue Q1; and, each session that is affected by the worker node crash is identified 501*b*.

Here, recall that in an embodiment, some form of identification of the worker node that is currently assigned to handle a session's requests is listed in that session's session table entry. For example, recall that the "Pr_Idx" index value observed in each session table entry in FIG. 6*a* is an index in the process table of the worker node assigned to handle the request. Assuming the Pr_Idx value has a component that identifies the applicable worker node outright, or can at least be correlated to the applicable worker node, the Pr_Idx values can be used to identify the sessions that are affected by the worker node crash. Specifically, those entries in the session table having a Pr_Idx value that corresponds to the crashed worker are flagged or otherwise identified as being associated with a session that has been "affected" by the worker node crash.

In the particular example of FIG. 6*b*, the SK1 session table 670 entry will be identified by way of a "match" with the Pr_Idx1 value; the SK2 session table 670 entry will be identified by way of a "match" with the Pr_Idx2 value; and, the SK3 session table 670 entry will be identified by way of a match with the Pr_Idx3 value.

Referring back to FIG. 5 and FIG. 6*b*, with the retracted request notifications 625, 626 at hand and with the affected sessions being identified, the ARC value is decremented 502, at 2 in the appropriate session table entry for each retracted request notification. Here, recall that each request notification contains an identifier of its corresponding session table entry (e.g., request notification 625 contains session key SK2 and request notification 626 contains session key SK3). Because of this identifier, the proper table entry of decrementing an ARC value can be readily identified.

Thus, the ARC value is decremented for the SK2 session entry in session table 670 and the ARC value is decremented for the SK3 session entry in session table 670. Because the ARC value for each of the SK1, SK2 and SK3 sessions was set equal to 1.0 prior to the crash of worker node $609_1$ (referring briefly back to FIG. 6*a*), the decrement 502, 2 of the ARC value for the SK2 and SK3 sessions will set the ARC value equal to zero in both of the SK2 and SK3 session table 670 entries as observed in FIG. 6*b*.

Because the request notification 624 for the SK1 entry had been removed from the request notification queue Q1 prior to the crash, it could not be "retracted" in any way and therefore its corresponding ARC value could not be decremented. As such, the ARC value for the SK1 session remains at 1.0 as observed in FIG. 6*b*.

Once the decrements have been made for each extracted request notification 502, at 2, decisions can be made as to which "affected" sessions are salvageable and which "affected" sessions are not salvageable. Specifically, those affected sessions that have decremented down to an ARC value of zero are deemed salvageable; while, those affected sessions who have not decremented down to an ARC value of zero are not deemed salvageable.

Having the ARC value of an affected session decrement down to a value of zero by way of process 502 corresponds to the extraction of a request notification from the failed worker node's request notification queue for every one of the session's non-responded to requests. This, in turn, corresponds to confirmation that the requests themselves are still safe in the request/response shared memory 650 and can therefore be subsequently re-routed to another worker node. In the simple example of FIGS. 6*a,b*, the second SK2 and third SK3 sessions each had an ARC value of 1.0 at the time of the worker node crash, and, each had a pending request notification in queue Q1. As such, the ARC value for the second SK2 and third SK3 sessions each decremented to a value of zero which confirms the existence of requests 628 and 629 in request/response shared memory 650. Therefore the second SK2 and third SK3 sessions can easily be salvaged simply by re-entering request notifications 625 and 626 into the request notification queue for an operational worker node.

The first session SK1 did not decrement down to a value of zero, which, in turn, corresponds to the presence of its request RQD_1 624 being processed by the worker node 609$_1$ at the time of its crash. As such, the SK1 session will be marked as "corrupted" and eventually dropped.

As another example, assume that each of the request notifications 624, 625, 626 where for the same "first" SK1 session. In this case there would be only one session table 670 entry SK1 in FIG. 6$a$ (i.e., entries SK2 and SK3 would not exist) and the ARC value in entry SK1 would be equal to 3.0 because no responses for any of requests 627, 628 and 629 have yet been generated. The crash of worker node 609$_1$ and the retraction of all of the request notifications 628, 629 from request notification queue Q1 would result in a final decremented down value of 1.0 for the session. The final ARC value of 1.0 would effectively correspond to the "lost" request 627 that was "in process" by worker node 609$_1$ at the time of its crash.

Referring to FIGS. 5 and 6$b$, once the salvageable sessions are known, the retracted request notifications for a same session are assigned to a new worker node based on a load balancing algorithm 503. The retracted request notifications are then submitted to the request notification queue for the new worker node that is assigned to handle the session; and, the corresponding ARC value is incremented in the appropriate session table entry for each re-submitted request notification.

Referring to FIG. 6$c$, worker node 609$_2$ is assigned to both the second and third sessions based on the load balancing algorithm. Hence request notifications 625, 626 are drawn being entered at 3 into the request notification queue Q2 for worker node 609$_2$. The ARC value for both sessions has been incremented back up to a value of 1.0. In the case of multiple retracted request notifications for a same session, in an embodiment, all notifications of the session would be assigned to the same new worker node and submitted to the new worker node's request notification queue in order to ensure FIFO ordering of the request processing. The ARC value would be incremented once for each request notification.

From the state of the system observed in FIG. 6$c$, each of request notifications 625, 626 would trigger a set of processes as described in FIGS. 3$a,b$ with worker node 609$_2$. Importantly, upon receipt of the request notifications 625, 626 the new targeted worker node 609$_2$ can easily access both the corresponding request data 628, 629 (through the pointer content of the request notifications and the shared memory architecture) and the session object(s) 622, 623 (through the request header content and the shared memory architecture).

Note that if different worker nodes were identified as the new target nodes for the second and third sessions, the request notifications 625, 626 would be entered in different request notification queues.

For distributable sessions, reassignment to a new worker node is a non issue because requests for a distributable session can naturally be assigned to different worker nodes. In order to advocate the implementation of a distributable session, in an implementation, only the session object(s) for a distributable session is kept in shared closure shared memory 660. Thus, the examples provided above with respect to FIGS. 3$a,b$ and 6$a,b,c$ in which low level session object(s) are stored in shared closure shared memory would apply only to distributable sessions. More details concerning shared closure shared memory are provided in section 6.0 "Implementation Embodiment of Shared Closure Shared Memory".

For sticky sessions various approaches exist. According to a first approach, session fail over to a new worker node is not supported and sticky sessions are simply marked as corrupted if the assigned worker node fails (recalling that session table entries may also include a flag that identifies session type).

According to a second approach, session fail over to a new worker node is supported for sticky sessions. According to an extended flavor of this second approach, some sticky sessions may be salvageable while others may not be. According to one such implementation, the session object(s) for a sticky session are kept in the local memory of a virtual machine of the worker node that has been assigned to handle the sticky session (whether the sticky session is rescuable or is not rescuable). Here, upon a crash of a worker node's virtual machine, the session object(s) for the sticky session that are located in the virtual machine's local memory will be lost.

As such, a sticky sessions can be made "rescuable" by configuring it to have its session object(s) serialized and stored to "backend" storage (e.g., to a hard disk file system in the application server or a persisted database) after each request response is generated. Upon a crash of a worker node assigned to handle a "rescuable" sticky session, after the new worker node to handle the sticky session is identified (e.g., through a process such as those explained by FIGS. 5$a$ and 5$b$), the session object(s) for the sticky session are retrieved from backend storage, deserialized and stored into the local memory of the new worker node's virtual machine. Here, sticky sessions that are not configured to have their session object(s) serialized and stored to backend storage after each response is generated are simply lost and will be deemed corrupted.

5.0 Implementation Embodiment of
Request/Response Shared Memory

Recall from above that according to a particular implementation, the request/response shared memory 250 has a connection oriented architecture. Here, a connection is established between the targeted worker node and the connection manager across the request/response shared memory 350 for each request/response cycle between the connection manager and a worker node. Moreover, a handle to a particular connection is used to retrieve a particular request from the request/response shared memory.

The connection oriented architecture allows for easy session handling transfer from a crashed worker node to a new worker node because the routing of requests to a new targeted worker node is accomplished merely by routing the handle for a specific request/response shared memory connection to the new worker node. That is, by routing the handle for a request/response shared memory connection to a new worker node, the new worker node can just as easily "connect" with the connection manager to obtain a request as the originally targeted (but now failed) worker node. Here, the "pointer" contained by the request notification is the handle for the request's connection.

FIG. 7 shows an embodiment of an architecture for implementing a connection based queuing architecture. According to the depiction in FIG. 7, the connection based queuing architecture is implemented at the Fast Channel Architecture (FCA) level 702. The FCA level 702 is built upon a Memory Pipes technology 701 which is a legacy "semaphore based" request/response shared memory technology 106 referred to in the Background. The FCA level 702 includes an API for establishing connections with the connection manager and transporting requests through them.

In a further embodiment, referring to FIGS. 2 and 7, the FCA level 702 is also used to implement each of the request notification queues 212. As such, the request notification queues 212 are also implemented as a shared memory technology. Notably, the handlers for the request notification queues 212 provide more permanent associations with their associated worker nodes. That is, as described, each of the request notification queues 212 is specifically associated with a particular worker node and is "on-going". By contrast, each request/response connection established across request/response shared memory 250 is made easily useable for any worker node (to support fail over to a new worker node), and, according to an implementation, exist only for each request/response cycle.

Above the FCA level 702 is the jFCA level 703. The jFCA level 703 is essentially an API used by the Java worker nodes and relevant Java parts of the connection manager to access the FCA level 702. In an embodiment, the jFCA level is modeled after standard Java Networks Socket technology. At the worker node side, however, a "jFCA connection" is created for each separate request/response cycle through request/response shared memory; and, a "jFCA queue" is created for each request notification queue. Thus, whereas a standard Java socket will attach to a specific "port" (e.g., a specific TCP/IP address), according to an implementation, the jFCA API will establish a "jFCA queue" that is configured to implement the request notification queue of the applicable worker node and a "jFCA connection" for each request/response cycle.

Here, an instance of the jFCA API includes the instance of one or more objects to: 1) establish a "jFCA queue" to handle the receipt of request notifications from the worker node's request notification queue; 2) for each request notification, establishing a "jFCA connection" over request/response shared memory with the connection manager so that the corresponding request from the request/response shared memory can be received (through the jFCA's "InputStream"); and, 3) for each received request, the writing of a response back to the same request/response shared memory connection established for the request (through the jFCA's "OutputStream").

In the outbound direction (i.e., from the worker node to the connection manager), in an embodiment, the same jFCA connection that is established through the request/response shared memory between the worker node and the connection manager for retrieving the request data is used to transport the response back to the connection manager.

In a further embodiment, a service (e.g., an HTTP service) is executed at each worker node that is responsible for managing the flow of requests/responses and the application(s) invoked by the requests sent to the worker node. In a further embodiment, in order to improve session handling capability, the service is provided its own "dedicated thread pool" that is separate from the thread pool that is shared by the worker node's other applications. By so doing, a fixed percentage of the worker node's processing resources are allocated to the service regardless of the service's actual work load. This permits the service to immediately respond to incoming requests during moments of light actual service work load and guarantees a specific amount of performance under heavy actual service workload.

According to one implementation, each thread in the dedicated thread pool is capable of handling any request for any session. An "available" thread from the dedicated thread pool listens for a request notifications arriving over the jFCA queue. The thread services the request from the jFCA queue and establishes the corresponding jFCA connection with the handler associated with the request notification and reads the request from request/response shared memory. The thread then further handles the request by interacting with the session information associated with the request's corresponding session.

Each worker node may have its own associated container (s) in which the service runs. A container is used to confine/define the operating environment for the application thread(s) that are executed within the container. In the context of J2EE, containers also provide a family of services that applications executed within the container may use (e.g., (e.g., Java Naming and Directory Interface (JNDI), Java Database Connectivity (JDBC), Java Messaging Service (JMS) among others).

Different types of containers may exist. For example, a first type of container may contain instances of pages and servlets for executing a web based "presentation" for one or more applications. A second type of container may contain granules of functionality (generically referred to as "components" and, in the context of Java, referred to as "beans") that reference one another in sequence so that, when executed according to the sequence, a more comprehensive overall "business logic" application is realized (e.g., stringing revenue calculation, expense calculation and tax calculation-components together to implement a profit calculation application).

6.0 Embodiment of Shared Closure Based Shared Memory

Figure 1B:
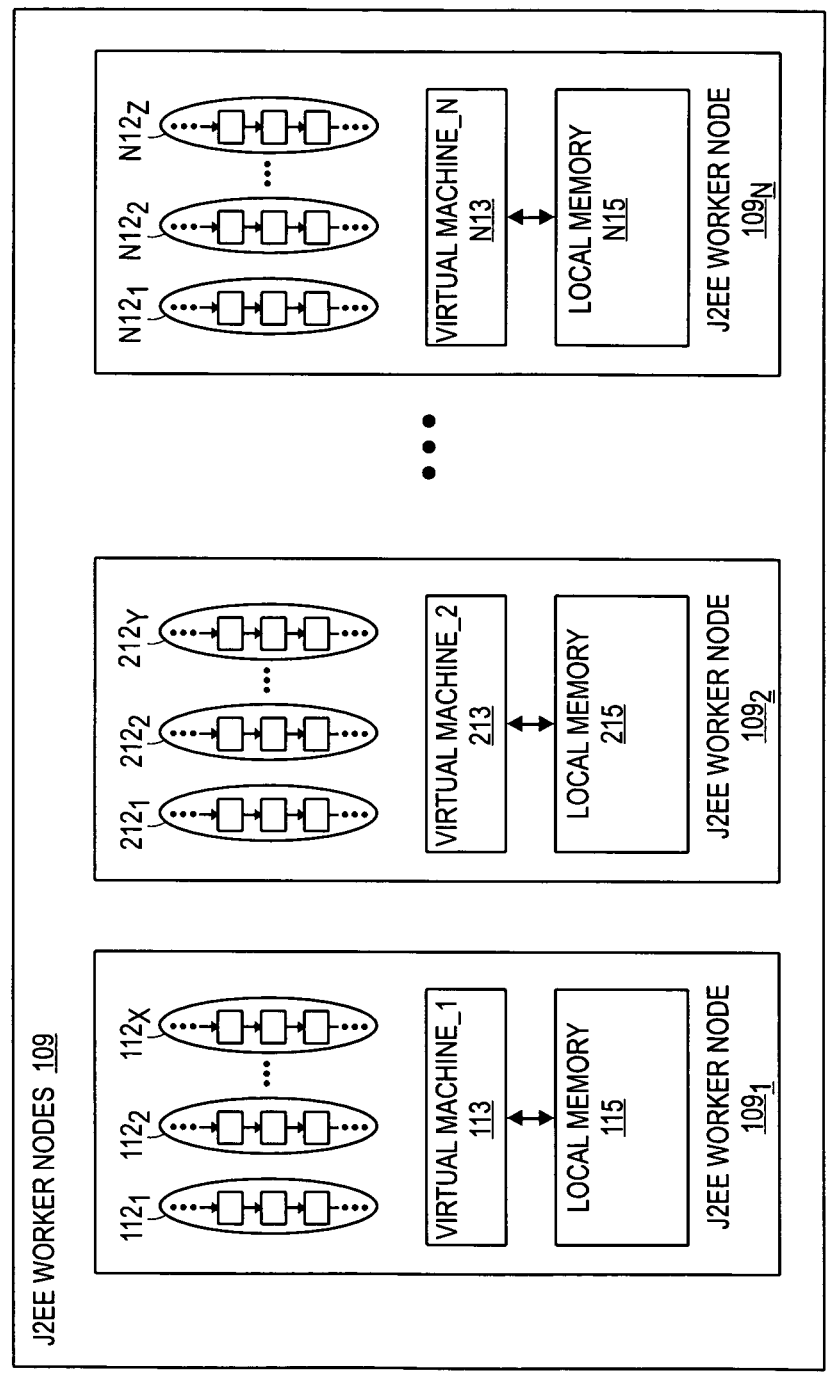

Recall from the discussion in the Background pertaining to FIG. 1b that a virtual machine crash is not an uncommon event, and that, in the prior art worker nodes 109 of FIG. 1b, a large number of sessions could be "dropped" by a single virtual machine crash because a large number of sessions were concurrently being executed by a single virtual machine.

FIG. 8 shows worker nodes 809 configured with less application threads per virtual machine than the prior art system of FIG. 1b. Less application threads per virtual machine results in less application thread crashes per virtual machine crash; which, in turn, should result in the application server exhibiting better reliability than the worker nodes 109 of FIG. 1b.

According to the depiction of FIG. 8, which is an ideal representation of the improved approach, only one application thread exists per virtual machine (specifically, thread 122 is being executed by virtual machine 123; thread 222 is being executed by virtual machine 223; . . . , and, thread M22 is being executed by virtual machine M23). In practice, within worker nodes 809 of FIG. 8, a limited number of threads may be concurrently processed by a virtual machine at a given time rather than only one. However, for simplicity, the present discussion will refer to the model depicted in FIG. 8 in which only one thread is concurrently processed per virtual machine.

In order to concurrently execute as many (or approximately as many) application threads as the worker nodes 109 of FIG. 1b, the improved approach of FIG. 8 instantiates comparatively more virtual machines than the prior art system 109 of FIG. 1b. That is, M>N. Thus, for example, if the worker nodes 109 of FIG. 1b has 20 threads per virtual machine and 8 virtual machines (for a total of 160 concurrently executed threads by the worker nodes 109 as a whole), the worker nodes 809 of FIG. 8 will have 1 thread per virtual machine and 160 virtual machines (to implement the same number of concurrently executed threads as the worker nodes 109 in FIG. 1b).

Recall from the discussion of FIG. 1b that a virtual machine can be associated with its own local memory. Because the improved approach of FIG. 8 instantiates comparatively more virtual machines that the prior art approach of FIG. 1b, in order to conserve memory resources, the virtual machines 813, 823, . . . M23 of the worker nodes 809 of FIG. 8 are configured with comparatively less local memory space 125, 225, . . . M25 than the virtual machines 113, 123, . . . N23 of FIG. 1b.

Moreover, the virtual machines 213, 223, . . . M23 of worker nodes 809 of FIG. 8 are configured to use a shared closure shared memory 860 (which corresponds to shared memory region 260, 360 and 660 in FIGS. 2, 3a,b and 6a,b,c). Shared closure shared memory 860 is memory space that contains items that can be accessed by more than one virtual machine (and, typically, any virtual machine configured to execute "like" application threads).

Thus, whereas the worker nodes 109 of FIG. 1b use comparatively fewer virtual machines with larger local memory resources containing objects that are "private" to the virtual machine; the worker nodes 809 of FIG. 8, by contrast, use more virtual machines with comparatively less local memory resources. The less local memory resources allocated per virtual machine is compensated for by allowing each virtual machine to access additional memory resources. However, owing to limits in the amount of available memory space, this additional memory space 860 is made "shareable" amongst the virtual machines 123, 223 . . . M23.

According to an object oriented approach where each of virtual machines 123, 223, . . . N23 does not have visibility into the local memories of the other virtual machines, specific rules are applied that mandate whether or not information is permitted to be stored in shared closure shared memory 860. Specifically, to first order, according to an embodiment, an object residing in shared closure shared memory 860 should not contain a reference to an object located in a virtual machine's local memory because an object with a reference to an unreachable object is generally deemed "non useable".

That is, if an object in shared closure shared memory 860 were to have a reference into the local memory of a particular virtual machine, the object is essentially non useable to all other virtual machines; and, if shared closure shared memory 860 were to contain an object that was useable to only a single virtual machine, the purpose of the shared memory 860 would essentially be defeated.

In order to uphold the above rule, and in light of the fact that objects frequently contain references to other objects (e.g., to effect a large process by stringing together the processes of individual objects; and/or, to effect relational data structures), "shareable closures" are employed. A closure is a group of one or more objects where every reference stemming from an object in the group which references another object does not reference an object outside the group. That is, all the object-to-object references of the group can be viewed as closing upon and/or staying within the confines of the group itself. Note that a single object without any references stemming from it meets the definition of a closure.

Thus, in order to prevent a reference from an object in shared closure shared memory 860 to an object in a local memory, only "shareable" (or "shared") closures may be stored in shared memory 860. In order to render a closure as "shareable", each object in the closure must be "shareable". A shareable object is an object that can be used by other virtual machines that store and retrieve objects from the shared closure shared memory 860. If a closure with a non shareable object were to be stored in shared closure shared memory 860, the closure itself would not be shareable with other virtual machines, which, again, defeats the purpose of the shared memory 860.

As discussed above, in an embodiment, one aspect of a shareable object is that it does not possess a reference to another object that is located in a virtual machine's local memory. Other conditions that an object must meet in order to be deemed shareable may also be affected. For example, according to a further embodiment, a shareable object must also posses the following characteristics: 1) it is an instance of a class that is serializable; 2) it is an instance of a class that does not execute any custom serializing or deserializing code; 3) it is an instance of a class whose base classes are all serializable; 4) it is an instance of a class whose member fields are all serializable; and, 5) it is an instance of a class that does not interfere with proper operation of a garbage collection algorithm.

Exceptions to the above criteria are possible if a copy operation used to copy a closure into shared memory 860 (or from shared memory 860 into a local memory) can be shown to be semantically equivalent to serialization and deserialization of the objects in the closure. Examples include instances of the Java 2 Platform, Standard Edition 1.3 java.lang.String class and java.util.Hashtable class.

7.0 Additional Comments

The architectures and methodologies discussed above may be implemented with various types of computing systems such as an application server that includes a Java 2 Enterprise Edition ("J2EE") server that supports Enterprise Java Bean ("EJB") components and EJB containers (at the business layer) and/or Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

FIG. 9 is a block diagram of a computing system 900 that can execute program code stored by an article of manufacture. It is important to recognize that the computing system block diagram of FIG. 9 is just one of various computing system architectures. The applicable article of manufacture may include one or more fixed components (such as a hard disk drive 902 or memory 905) and/or various movable components such as a CD ROM 903, a compact disc, a magnetic tape, etc. In order to execute the program code, typically instructions of the program code are loaded into the Random Access Memory (RAM) 905; and, the processing core 906 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 906.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An application server comprising:
a connection manager to receive a request associated with an existing distributable session;
a request notification queue communicatively coupled to the connection manager to store a request notification of the request, the request notification to be retrieved by a worker node assigned to process the request, wherein the request notification queue is one of a plurality of request notification queues, the worker node is one of a plurality of worker nodes, and each one of the plurality of request notification queues is associated with a respective one of the plurality of worker nodes;
a memory communicatively coupled to the connection manager to store request data, response data and session data of the request; and
a dispatcher communicatively coupled to the connection manager to send the request to the worker node assigned to handle the session if the worker node is available, the dispatcher identifying the worker node assigned to handle the session by querying the session data to determine if the session is already existing and retrieving the worker node assigned to handle the session, the worker node processing the request by retrieving the request notification from the request notification queue associated with the worker node, and the request data and the session data from the memory, the dispatcher to select another worker node from the plurality of worker nodes to which to send the request according to a load balancing algorithm if the worker node is not available.

2. The application server of claim 1, wherein the worker node is available if there are no active requests for the session that the worker node assigned to handle the session has yet to process.

3. The application server of claim 2, wherein the worker node is available if additionally there are no active request notifications pending in the request notification queue associated with the worker node assigned to handle the session.

4. The application server of claim 1, wherein the worker node is not available if the worker node is busy.

5. The application server of claim 1, wherein the dispatcher to select the other worker node to which to send the request comprises the dispatcher to select on a round-robin basis the other worker node from a list of worker nodes maintained in a data structure accessible to the dispatcher.

6. The application server of claim 1, wherein the dispatcher to select another worker node to which to send the request comprises the dispatcher to select on a weighted basis the other worker node from a list of worker nodes maintained in a data structure accessible to the dispatcher.

7. The application server of claim 6, wherein the dispatcher selects the other worker node based on a lowest number of request notifications in the request notification queue associated with the other worker node as compared to a number of request notifications in a respective request notification queue associated with each of the worker nodes in the list.

8. The application server of claim 7, wherein the dispatcher traverses the list of worker nodes and selects a first worker node with an empty associated request notification queue.

9. The application server of claim 8, wherein if there is a tie among two or more worker nodes in the list based on the number of request notifications in the respective request notification queues, the dispatcher selects the worker node that has at least one idle thread.

10. A method comprising:
receiving a request associated with an existing distributable session at a connection manager;
receiving a request notification of the request at a request notification queue from the connection manager, the request notification being retrieved by a worker node assigned to process the request, wherein the request notification queue is one of a plurality of request notification queues, the worker node is one of a plurality of worker nodes, and each one of the plurality of request notification queues is associated with a respective one of the plurality of worker nodes;
storing request data, response data and session data of the request in a memory, the memory being accessible to the connection manager and the worker node;
examining at a dispatcher whether the worker node assigned to handle the session is available to process the request, the examining including querying the session data to determine if the session is an existing session and retrieving the worker node assigned to handle the session;
sending the request from the dispatcher to the assigned worker node if the assigned worker node is available, the worker node processing the request by retrieving the request notification from the request notification queue associated with the worker node and the request data and the session data from the memory; and
selecting another worker node from the plurality of worker nodes to which to send the request according to a load balancing algorithm if the assigned worker node is not available.

11. The method of claim 10 further comprising determining that the assigned worker node is available if there are no active requests for the session that the assigned worker node has yet to process.

12. The method of claim 11, wherein the assigned worker node is available if there are no active request notifications pending in the request notification queue associated with the assigned worker node.

13. The method of claim 10, wherein selecting another worker node to which to send the request comprises selecting on a round-robin basis the other worker node from a list of worker nodes maintained in a data structure accessible to the dispatcher.

14. The method of claim 10, wherein selecting another worker node to which to send the request comprises selecting on a weighted basis the other worker node from a list of worker nodes maintained in a data structure accessible to the dispatcher.

15. The method of claim 14, wherein selecting the other worker node is based on a lowest number of request notifications in the request notification queue associated with the other worker node as compared to a number of request notifications in a respective request notification queue associated with each of the worker nodes in the list.

16. The method of claim 14, wherein selecting the other worker node comprises traversing by the dispatcher the list of worker nodes and selecting a first worker node with an empty associated request notification queue.

17. The method of claim 16, wherein selecting the other worker node comprises selecting the worker node that has at least one idle thread if there is a tie among two or more worker nodes in the list based on the number of request notifications in respective request notification queues.

18. An article of manufacture, comprising:
an electronically accessible medium comprising instructions, that when executed by a processor cause the processor to:
receive a request associated with an existing distributable session at a connection manager;
receive a request notification of the request at a request notification queue from the connection manager, the request notification being retrieved by a worker node assigned to process the request, wherein the request notification queue is one of a plurality of request notification queues, the worker node is one of a plurality of worker nodes, and each one of the plurality of request notification queues is associated with a respective one of the plurality of worker nodes;
store request data, response data and session data of the request in a memory, the memory being accessible to the connection manager and the worker node;
examine at a dispatcher whether the worker node assigned to handle the session is available to process the request, the examining including querying the session data to determine if the session is an existing session and retrieving the worker node assigned to handle the session;
send the request from the dispatcher to the assigned worker node if the assigned worker node is available, the worker node processing the request by retrieving the request notification from the request notification queue associated with the worker node and the request data and the session data from the memory; and
select another worker node to which to send the request according to a load balancing algorithm if the assigned worker node is not available.

19. The article of manufacture of claim 18 further comprising instructions that cause the processor to determine that the assigned worker node is available if there are no active requests for the session that the assigned worker node has yet to process.

20. The article of manufacture of claim 18, wherein the instructions that cause the processor to select another worker node to which to send the request comprises instructions that cause the processor to select on a weighted basis the other worker node from a list of worker nodes maintained in a data structure accessible to the dispatcher.

21. The article of manufacture of claim 20, wherein the instructions that cause the processor to select the other worker node is based on a lowest number of request notifications in a request notification queue associated with the other worker node as compared to a number of request notifications in a respective request notification queue associated with each of the worker nodes in the list.

* * * * *